(12) United States Patent
Lee et al.

(10) Patent No.: US 12,063,122 B2
(45) Date of Patent: Aug. 13, 2024

(54) METHOD FOR OPERATING VOICE CHAT ROOM DEPENDENT ON MESSAGE CHAT ROOM, AND SERVER AND TERMINAL FOR PERFORMING THE SAME

(71) Applicant: KAKAO CORP., Jeju-si (KR)

(72) Inventors: Eun Hye Lee, Seongnam-si (KR); Ji Hwi Park, Seongnam-si (KR); Hyo Jin Ham, Seongnam-si (KR); Na Yeon Kim, Seongnam-si (KR); Eung Ju Park, Seongnam-si (KR); Jung Taek Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/147,788

(22) Filed: Dec. 29, 2022

(65) Prior Publication Data
US 2023/0362025 A1    Nov. 9, 2023

(30) Foreign Application Priority Data

Dec. 30, 2021 (KR) .......................... 10-2021-0193558

(51) Int. Cl.
*H04L 12/18*        (2006.01)
(52) U.S. Cl.
CPC ...... *H04L 12/1822* (2013.01); *H04L 12/1818* (2013.01)
(58) Field of Classification Search
CPC ... H04L 12/1822; H04L 12/1818; A63F 13/87
See application file for complete search history.

(56) References Cited

U.S. PATENT DOCUMENTS

| | | |
|---|---|---|
| 7,639,672 B2 * | 12/2009 | Foote .................. H04L 12/1822 709/224 |
| 7,817,584 B2 * | 10/2010 | Campbell ............... H04L 51/04 370/235 |

(Continued)

FOREIGN PATENT DOCUMENTS

| | | |
|---|---|---|
| JP | 2016-024557 A | 2/2016 |
| JP | 2018524717 A | 8/2018 |

(Continued)

OTHER PUBLICATIONS

Y. Hwang, Office action as to KR10-2021-0193558, Aug. 29, 2023, 17, 9-5-2023-078379263, Korean Intellectual Property Office, Daejeon, Republic of Korea.

(Continued)

*Primary Examiner* — Nazia Naoreen
(74) *Attorney, Agent, or Firm* — NKL LAW; Jae Youn Kim

(57) ABSTRACT

Disclosed is a method for operating and participating in a voice chat room subordinate to a message chat room is disclosed. The method for operating a voice chat room subordinate to a message chat room includes: managing, by a server, messages transmitted and received through the message chat room in which a first user and a second user participate; receiving, by the server, a request for creation of the voice chat room subordinate to the message chat room from the first user; creating, by the server, the voice chat room in response to the received request for creation of the voice chat room; providing, by the server, information that the voice chat room is being operated to the second user through the message chat room; providing, by the server, information that the voice chat room is being operated to the second user through a message chat room list.

20 Claims, 16 Drawing Sheets

(56) References Cited

U.S. PATENT DOCUMENTS

| | | | |
|---|---|---|---|
| 7,882,243 B2* | 2/2011 | Ivory | A63F 13/87 |
| | | | 709/227 |
| 8,725,819 B2* | 5/2014 | Fujihara | H04L 12/1818 |
| | | | 709/206 |
| 10,135,989 B1* | 11/2018 | Indyk | G10L 15/14 |
| 10,454,694 B2* | 10/2019 | Ahi | H04L 51/52 |
| 10,469,422 B2* | 11/2019 | Ushio | H04M 11/00 |
| 10,587,690 B2* | 3/2020 | Borodiak | H04L 67/306 |
| 11,018,883 B2* | 5/2021 | Chandran | H04L 12/1827 |
| 11,297,469 B2* | 4/2022 | Frolovichev | H04W 4/12 |
| 2007/0162553 A1* | 7/2007 | Dewing | H04L 65/4038 |
| | | | 709/207 |

FOREIGN PATENT DOCUMENTS

| | | | |
|---|---|---|---|
| JP | 2021111398 A | | 8/2021 |
| KR | 2013-0115156 A | | 10/2013 |
| KR | 101654261 B1 | | 9/2016 |
| KR | 2016-0132709 A | | 11/2016 |
| KR | 10-1979535 B1 | | 5/2019 |
| KR | 10-2054728 B1 | | 12/2019 |
| KR | 2020-0133965 A | | 12/2020 |
| KR | 2021-0080964 A | | 7/2021 |
| WO | 2010110155 A1 | | 9/2010 |

OTHER PUBLICATIONS

Yoshiharu Kobayashi, Office Action, Japanese Application No. 2022-212175, Jan. 26, 2024, 4pages, Japan Patent Office.

* cited by examiner

METHOD FOR OPERATING VOICE CHAT ROOM DEPENDENT ON MESSAGE CHAT ROOM, AND SERVER AND TERMINAL FOR PERFORMING THE SAME

BACKGROUND OF INVENTION

Field of the Invention

The present disclosure relates to a method for a server to create and operate a voice chat room which is subordinate to a message chat room, and in which participants of the message chat room are allowed to participate, and the server and a terminal for performing the method.

Related Art

With the wide spread of various smart electronic devices such as smartphones, tablet PCs, and wearable devices, and the development of mobile communication technologies for enabling high-speed communication, various types of chat services have been being provided. In particular, unlike a message chat room in which information is transmitted and received in the form of messages between participants, a voice chat room in which audio information input by a participant can be shared with other participants in real time has been recently caught many people's attention.

In an existing voice chat room service, multiple voice chat rooms in operation are provided in the form of a list to a user, and the user checks information (topic, participants, and date and time of creation) of the voice chat room to request for participation in the voice chat room.

However, the existing chat room service has a problem in that the voice chat room does not interwork with other message chat rooms or Internet community groups. Thus, participants of a message chat room wish to create a voice chat room, it is required to create and operate the voice chat room separately from the message chat room.

In the case of the voice chat room being operated separately from the message chat room, it is difficult to attract participants of the message chat room and it is difficult to manage qualifications required to participate in the voice chat room.

Therefore, there is a need for a method for creating and operating a voice chat room in a manner that allows participants to easily join the voice chat room from a pre-existing message chat room and easily manages qualifications required to participate in the voice chat room.

RELATED DOCUMENT

Patent Document (Patent Document 1) Korean Patent No. 10-1654261 (registered on Aug. 30, 2016)
(Patent Document 2) Korean Patent No. 10-1979535 (registered on May 10, 2019)

SUMMARY

An aspect of the present disclosure provides a method for creating a voice chat room subordinate to a message chat room, so that only participants of the message chat room are allowed to participate in the voice chat room.

Another aspect of the present disclosure provides a method for operating a voice chat room, so that participants of an existing message chat room are encouraged to join a voice chat room subordinate to the message chat room.

Yet another aspect of the present disclosure provides a method for a user terminal to participate in a voice chat room subordinate to a message chat room through link information posted in a posting space.

In one aspect, there is provided a method for operating a voice chat room subordinate to a message chat room, the method including: managing, by a server, messages transmitted and received through the message chat room in which a first user and a second user participate; receiving, by the server, a request for creation of the voice chat room subordinate to the message chat room from the first user, wherein the voice chat room is a chat room in which participants are able to transmit and receive audio information with each other, and in which only participants of the message chat room are allowed to participate; creating, by the server, the voice chat room in response to the received request for creation of the voice chat room; providing, by the server, information that the voice chat room is being operated to the second user through the message chat room; providing, by the server, information that the voice chat room is being operated to the second user through a message chat room list; receiving, by the server, a request for participation in the voice chat room from the second user; and managing, by the server, audio information transmitted and received through the voice chat room in which the first user and the second user participate.

In one embodiment of the present disclosure, in the providing of the information that the voice chat room is being operated through the message chat room, the server may provide an interface for participating in the voice chat room together with the information that the voice chat room is being operated.

In one embodiment of the present disclosure, in the receiving of the request for participation in the voice chat room, the server may receive the corresponding request through the message chat room.

In one embodiment of the present disclosure, the method may further include receiving, by the server, the request for participation in the voice chat room from a third user through voice chat room link information posted in a posting space.

In one embodiment of the present disclosure, the method may further include: receiving, by the server, a request for issuance of voice chat room link information from one of the participants of the voice chat room; and providing, by the server, the link information to one of the participants of the voice chat room in response to the request for issuance. of the link information.

In one embodiment of the present disclosure, the method may further include, in response to the request for participation in the voice chat room from the third user, accepting, by the server, participation of the third user in the voice chat room when the third user is participating in the message chat room.

In one embodiment of the present disclosure, the method may further include, in response to the request for participation in the voice chat room from the third user, providing, by the server, information for participation in the message chat room to the third user when the third user is not participating in the message chat room.

In one embodiment of the present disclosure, the method may further include, in response to receiving a request for participation in the message chat room from the third user, accepting, by the server, participation of the third user both in the message chat room and the voice chat room.

In one embodiment of the present disclosure, the method may further include, in response to the request for participation in the voice chat room from the third user, providing, by the server, the third user with information indicating termination of the voice chat room when the voice chat room is terminated at a time of receiving the request for participation in the voice chat room from the third user.

In one embodiment of the present disclosure, the method may further include: receiving, by the server, a request for notification of creation of any other voice chat room subordinate to the message chat room from the third user; and in response to the request for notification, providing, by the server, a notification to the third user when any other voice chat room subordinate to the message chat room is created.

In one embodiment of the present disclosure, the method may further include: managing, by the server, a participant with an authority to request the creation of the voice chat room from among the participants of the message chat room differently from any other participant, wherein the first user corresponds to the participant who has the authority to request the creation of the voice chat room; and providing, by the server, an interface through which the participant with the authority are able to request the creation of the voice chat room subordinate to the message chat room, wherein the requesting of the creation of the voice chat room is made by the first user's interaction with respect to the interface.

In one embodiment of the present disclosure, the method may further include: managing a participant with an authority to request creation of the voice chat room from among the participants in the message chat room differently from any other participant, wherein the first user corresponds to the participant with the authority to request creation of the voice chat room and the second user corresponds to the any other participant; receiving, by the server, information for requesting the creation of the voice chat room subordinate to the message chat room from the second user; and providing, by the server, information for requesting the creation of the voice chat room to the first user.

In one embodiment of the present disclosure, the method may further include providing, by the server, at least some of messages provided through the message chat room to the participants of the voice chat room through the voice chat room.

In one embodiment of the present disclosure, the method may further include: receiving, by the server, a request for provision of at least a part of audio information provided through the voice chat room from the second user who is not participating in the voice chat room; and, in response to the request for provision of at least a part of audio information, providing, by the server, the at least a part of the audio information provided through the voice chat room to the second user.

In one embodiment of the present disclosure, the at least a part of the audio information may be audio information provided to the participants of the voice chat room for a predetermined time based on a point in time when the server receives the request for provision of the at least a part of the audio information.

In another aspect, there is provided a method for participating in a voice chat room subordinate to a message chat room, the method including: displaying, by a user terminal, the message chat room containing messages transmitted and received between the participants; displaying, by the user terminal, in a message chat room, information that the voice chat room subordinate to the message chat room is being operated by a user of a counterpart terminal, and an interface for transmitting a request for participation in the voice chat room, wherein the voice chat room is a chat room in which participants are able to transmit and receive audio information with each other, and in which only participants of the message chat room are allowed to participate in the voice chat room; displaying, by the user terminal, information indicating that the voice chat room subordinate to the message chat room is being operated, so that the information corresponds to the message chat room in a message chat room list in which information on multiple message chat rooms is displayed; receiving, by the user terminal, an interaction with respect to the interface, and transmitting, by the user terminal, a request for participation in the voice chat room to a server; displaying, by the user terminal, a voice chat room including information indicating that the user of the counterpart terminal is a speaker, wherein the speaker is able to transmit audio information to other participants in the voice chat room; and receiving, by the user terminal, an audio signal transmitted from the counterpart terminal through the server, and outputting, by the user terminal, the transmitted audio signal, wherein the user of the counterpart terminal and the user of the user terminal are participants in the message chat room.

In yet another aspect, there is provided a method for participating in a voice chat room subordinate to a message chat room, the method including: displaying, by a user terminal, voice chat room link information posted in a posting space, wherein the voice chat room is a chat room in which participants are able to transmit and receive audio information with each other; receiving, by the user terminal, an interaction with respect to the link information and transmitting a request for participation in the voice chat room to a server; in response to the user of the user terminal being a participant of a message chat room to which the voice chat room is subordinate, displaying, by the user terminal, a voice chat room including information that a user of a counterpart terminal is a speaker, wherein the speaker is able to transmit audio information to other participants in the voice chat room; and in response to the user of the user terminal being not a participant of the message chat room, displaying, by the user terminal, a page for participation in the message chat room.

In one embodiment of the present disclosure, the method may further include: transmitting, by the user terminal, a request for participation in the message chat room to the server through the page; and in response to the server accepting the corresponding request, simultaneously displaying, by the user terminal, the message chat room and audio information provided through the voice chat room.

In one embodiment of the present disclosure, in the simultaneously displaying, the user terminal may display a screen showing the audio information so as to overlap a screen showing the message chat room.

In an embodiment of the present disclosure, the method may further include, in response to the voice chat room being terminated, displaying, by the user terminal, information that the voice chat room is terminated.

In the present disclosure, it is possible to provide a method for creating and operating a voice chat room subordinate to a message chat room, so that only participants of the message chat room are allowed to participate in the voice chat room.

In the present disclosure, it is possible to easily encourage participants of an existing message chat room to participate in a voice chat room subordinate to the message chat room.

In the present disclosure, it is possible for a user terminal to easily participate in a voice chat room subordinate to a message chat room through link information posted in a posting space.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," and the like, may be used to describe various components, such components are not limited by the above terms. The above terms are used only to distinguish one component from another.

The singular forms are intended to include the plural forms as well, unless the context clearly indicates otherwise.

In this specification, each step described can be performed regardless of a listed order, except for a case where it must be performed in the listed order due to a special causal relationship.

In this application, the term "comprise" or "have" is intended to designate characteristic, numbers, steps, operations, elements, components, or combinations thereof, but it is not intended to preclude the presence or addition of one or more other features, numbers, steps, operations, elements, components, or combinations.

Hereinafter, the present disclosure will be described with reference to the accompanying drawings.

Figure 1:
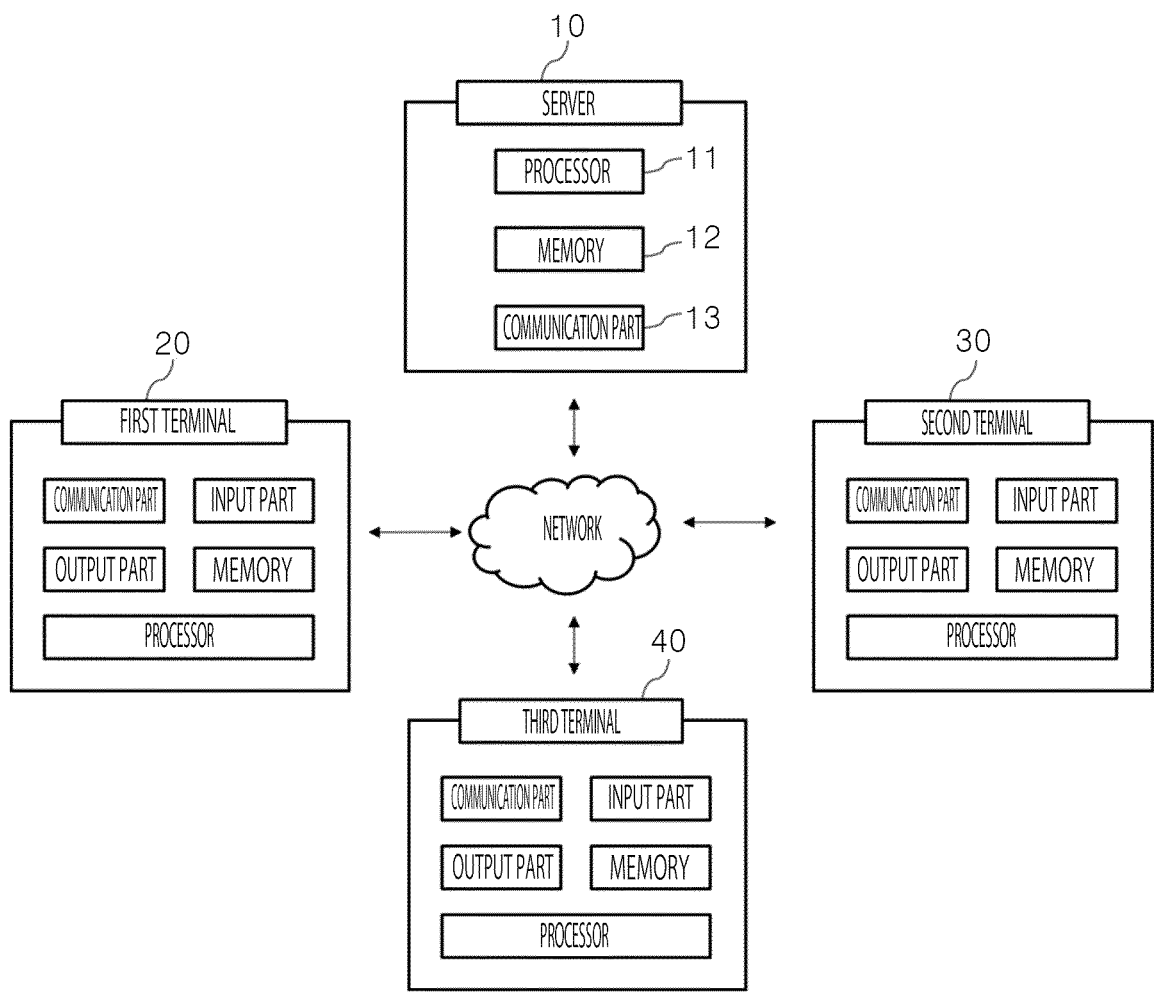
FIG. 1 is a diagram illustrating an example of a server, a user terminal, and a network environment connected thereto according to an embodiment of the present disclosure.

FIG. 1 is a diagram illustrating an example of a network environment according to an embodiment of the present disclosure. A network environment according to an embodiment of the present disclosure shown in FIG. 1 may include a server 10 and a user terminal. The user terminal may include a first terminal 20, a second terminal 30 and a third terminal 40.

A network is not limited in communication method, and may include not only a communication method of utilizing a communication network (e.g., mobile communication network, wired Internet, wireless Internet, and broadcasting network) that the network can include, but also short-distance wireless communication.

The server 10 may be implemented as a computer device or a plurality of computer devices for providing commands, codes, files, contents, services, and the like. The server 10 may be a server 10 capable of transmitting and receiving information through communication with a user terminal via a network.

The server 10 may include a processor 11, a memory 12 and a communication part 13.

The processor 11 may control overall operations of the memory 12 and the communication part 13 to provide a chat service through a message chat room and a voice chat room to a user terminal and execute an application associated with the chat service.

The memory 12 may serve as a storage medium and may store a plurality of application programs running in the server 10, and data and instructions for operating the server 10. In one embodiment, the memory 12 may store applications associated with a chat service.

This memory 12 may be provided in the form of various hardware storage devices such as ROM, RAM, flash drive, hard drive, and the like, or may be provided in the form of web storage.

The communication part 13 may communicate with the user terminal via the network by wire or wirelessly.

The server 10 of the present disclosure may provide a chat service to a user terminal through a message chat room. The chat service provided by the server 10 may be provided through a message chat room and a voice chat room.

Specifically, the server 10 provides a message chat room in which participants are able to send and receive messages with each other. Here, a message includes a text, an image, a video, a voice, a file, contact information, location information, and voting information of the participants. The message chat room may include a private chat room in which only the creator of the chat room and participants invited by the creator are allowed to participate, and a public chat room in which participation is possible through link information publicly posted in a posting space even without creation and invitation of the chat room. An example of a public chat room service is open chatting (registered trademark of Kakao Corporation) provided by Kakao Corporation through KakaoTalk (registered trademark of Kakao Corporation). Such a message chat room may be a chat room of participants in a specific relationship or a chat room for a specific topic. In the present disclosure, the scope of the present disclosure is not limited by the type and nature of a message chat room.

In some cases, participants in a message chat room may be classified by entitlement according to a predetermined criterion. For example, the server 10 may classify participants of a message chat room into a host, a moderator, and a general participant. The type (grade) for classifying participants may be variously changed and determined.

In addition, the server 10 of the present disclosure may provide an audio information sharing service for a user terminal through a voice chat room. The voice chat room refers to a chat room in which participants are able to transmit and receive audio information with each other. Here, the audio information may be information on voice, sound, or music input through a participant's terminal. Voice information input by a participant through a voice chat room may be shared with other participants in real time. In this way of sharing audio information, audio information is shared with other participants in real time as soon as a participant speaks, unlike the above-described case where a voice file recorded in a message chat room is shared and a participant having received the shared voice file listens to the file by reproducing the same. In a voice chat room, information to be transmitted and received is not limited only to audio information. Participants may be able to transmit and receive texts, images, videos, files, contact information, location information, and voting information of the participants other than audio information through a voice chat room. Examples of voice chat room services include mm (registered trademark of Kakao Corporation) provided by Kakao Corporation and Clubhouse provided by Alpha Exploration Co.

Qualifications of participants in the voice chat room may be classified into a speaker and a listener. The speaker may transmit audio information input by himself/herself in the voice chat room to other participants in the voice chat room. Unlike the speaker, the listener does not have the authority to transmit audio information input by the listener to other participants, but may be able to only receive and listen to the audio information of the speaker. The qualifications of the participants may change according to the voice chat room's moderator or the server's operating policy. That is, for example, a participant who was a listener may switch to a speaker at his or her request.

Hereinafter, in the present specification, a message chat room and a voice chat room will be described as different chat rooms distinct from each other.

The server of the present disclosure may create and operate a voice chat room subordinate to a message chat room. In the voice chat room subordinate to the message chat room, only participants of the message chat room are allowed to participate. Thus, if a user not participating in a message chat room requests to participate in a voice chat room subordinate to the message chat room, the user must first participate in the message chat room.

The server of the present disclosure provides a plurality of methods for participating in a voice chat room created in dependence on a message chat room. First, the server may provide a method for participating in a voice chat room through an interface provided through a message chat room. In addition, the server may provide a method for participating in a voice chat room through link information posted in a posting space.

The user terminal may include a first terminal 20, a second terminal 30 and a third terminal 40. The user terminal may be a fixed terminal implemented as a computer device, or may be a mobile terminal. In one example, the user terminal may include a smart phone, a mobile phone, a tablet PC, a computer, a laptop computer, and a personal digital assistant (PDA). In one example, the user terminal may communicate with the server 10 or other user terminals via a network by wire or wirelessly.

The user terminal may be used by a user. The user may be a user of the user terminal, but may also mean an account registered as a user in a chat service provided by the server 10 (including a message chat room service and a voice chat room service). Thus, the meaning that the server 10 transmits specific information to a user may imply that the information is transmitted to a user terminal through the user's account registered in the server 10.

The user terminal may include a communication part, an input part, an output part, a memory, and a processor.

The communication part may communicate with the server 10 or other terminals by wire or wirelessly.

The input part may receive various types of information through a user's manipulation and input. The input part may be a touch screen module, a keyboard, a mouse, a button, a camera, a stylus, a microphone, and the like.

The user terminal may receive a user's interaction through the input part. The interaction means that a user manipulates the input part to input information reflecting the user's selection or intention to the user terminal. For example, the interaction may be a touch on a touch screen, a click of a mouse, typing of a keyboard, sound input of a microphone, image capture by a camera, motion recognition by a motion sensor, and the like.

The output part may output various types of information. The output part may be a display device, a speaker, a vibration generating device, a tactile sensation generating device, and the like. In some cases, the output part may be a device (e.g., Bluetooth earphone) that is connected to the user terminal through wired or wireless communication (e.g., short-range wireless communication such as Bluetooth) to receive and output signals.

The memory serves as a storage medium and may store a plurality of application programs running in the user terminal, data and instructions for operating the user terminal. Such memory may be provided in the form of various hardware storage devices such as ROM, RAM, flash drive, hard drive, and the like, or may be provided in the form of web storage.

In one example, applications associated with a message chat room service and a voice chat room service may be stored in the memory.

The processor may control overall operations of the communication part, the input part, the output part, and the memory to execute applications associated with a message chat room service and a voice chat room service.

A user of the first terminal 20 may be a participant of a message chat room and may be a user who creates a voice chat room. The first terminal 20 may display an interface associated with a request for creation of a voice chat room. The interface associated with a request for creation of a voice chat room may be provided in a state in which the user of the first user 20 has entered a message chat room. By inputting an interaction on the interface, the user of the first terminal 20 may transmit a request for creation of a voice chat room subordinate to the message chat room to the server.

When the voice chat room subordinate to the message chat room is created by the server, the user of the first terminal 20 may act as a speaker in the voice chat room. Specifically, the first terminal 20 may transmit input audio information to other participants of the voice chat room.

A user of the second terminal 30 is participating in the message chat room and may request for participation in the voice chat room subordinate to the message chat room. Since the user of the second terminal 30 is already a participant of the message chat room, the user is able to immediately participate in the voice chat room without a separate process for participating in the message chat room.

The first terminal 20 or the second terminal 30 may receive voice chat room link information from the server and post the voice chat room link information on a posting space. The third terminal 40 may transmit a request for participation in the voice chat room to the server through the link information. The third terminal 40 may not be a participant of the message chat room. In this case, the third terminal 40 must first participate in the message chat room and then participate in the voice chat room.

Hereinafter, for convenience of explanation, the user of the first terminal 20 is referred to as a first user, the user of the second terminal 30 as a second user, and the user of the third terminal as a third user.

Hereinafter, referring to FIG. 2, a method in which a server of the present disclosure operates a voice chat room subordinate to a message chat room will be described.

In operation S110, the server 10 manages messages transmitted and received through a message chat room. Here, the message chat room may be a chat room in which a first user and a second user participate. The server 10 may provide a message, transmitted by the first user or the second user to the server 10, to participants of the message chat room through the message chat room.

In operation S120, the server 10 may receive a request for creation of a voice chat room subordinate to the message chat room from the first user. Here, the voice chat room being subordinate to the message chat room means that only participants of the message chat room are allowed to participate in the voice chat room. In this embodiment, since both the first user and the second user are participants of the message chat room, the first user and the second user are allowed to participate in the voice chat room subordinate to the message chat room.

The server 10 may authorize only some of the participants of the message chat room to request creation of the voice chat room subordinate to the message chat room. Specifically, the server 10 may authorize only participants classified as a host or moderator in the message chat room to request creation of the voice chat room subordinate to the message chat room. Here, the first user may be the host or moderator of the message chat room, and may have an authority to request creation of the voice chat room subordinate to the message chat room.

A first terminal 20 (a terminal of the first user) may display an interface to request creation of the voice chat room subordinate to the message chat room. The interface may be provided only after the first terminal 20 enters the message chat room. In response to receiving an interaction with the interface from the first user, the first terminal 20 generates voice chat room creation request information. This voice chat room creation request information is transmitted to the server 10.

In operation S130, the server 10 creates the voice chat room subordinate to the message chat room in response to the request received in operation S120. In an initially created voice chat room, the first user who requested the creation of the voice chat room may be designated as a speaker. In addition, the initially created voice chat room may be created in a state in which the first user is the only one participant.

In operation S140, the server 10 provides the second user through the message chat room with information indicating that the voice chat room is being operated. Since the second user is participating in the message chat room, the second user may receive, through the message chat room, the information indicating that the voice chat room is being operated.

The information indicating that the voice chat room is being operated is information notifying that the voice chat room subordinate to the current message chat room is being operated. In operation S140, the server 10 may provide the second user with information indicating that the voice chat room is being operated and an interface for participating in the voice chat room. For example, a join button for participating in the voice chat room may be provided together with information indicating that the voice chat room is being operated through an interface. In addition, a feature for touching a message displaying the information indicating that the voice chat room is being operated through the interface may be provided.

The information indicating that the voice chat room is being operated may be provided to the message chat room in various forms. For example, the information indicating that the voice chat room is being operated may be provided in the form of a message in the message chat room. Specifically, the information indicating that the voice chat room is being operated may be provided in the form of a message spoken by the first user in the message chat room. The displayed position of the message-type information indicating that the voice chat room is being operated may be changed when another subsequent message is provided through the message chat room.

Also, for example, the information indicating that the voice chat room is being operated may be provided in the form of a fixed message in the message chat room. Here, the fixed message type refers to a type in which the corresponding message is displayed at a partly designated area of the message chat room and the displayed position does not change even if a subsequent message is displayed.

In some cases, in operation S140, the server 10 may provide the second user with information, which indicates that the voice chat room is being operated, in a form corresponding to the corresponding message chat room on a chat room list. The second user may display a chat room list in which information on multiple message chat rooms is displayed. The information indicating that the voice chat room is being operated may be displayed to correspond to the message chat room to which the voice chat room is subordinate in the chat room list.

In some cases, in operation S140, the server 10 may provide information indicating that the voice chat room is being operated to the second user in various forms associated with the message chat room. For example, the second terminal 30 (the terminal of the second user) may display information, which indicates that the voice chat room is being operated, in the form of a push notification or a status notification.

The second user may select or control a method in which the information indicating that the voice chat room is being operated is displayed in the second terminal 30. For example, the second user may set the second terminal 30 to receive a message indicating that the voice chat room is being operated, but not to provide a push notification and a status notification. It is also possible to separately set whether or not to receive such messages and notifications in each message chat room.

In operation S150, the server 10 receives a request for participation in the voice chat room from the second user. The second user may transmit a request for participation in the voice chat room in various ways. Specifically, as described above, a request for participation in the voice chat room may be generated through an interface provided together with information indicating that the voice chat room is being operated. In addition, a request for participation in the voice chat room may be generated through link information which will be described later.

After operation S150, the server 10 may accept the second user's participation in the voice chat room. As described above, the second user is allowed to participate in the voice chat room because the second user is participating in the message chat room to which the voice chat room is subordinate. In some cases, if there is a limiting factor, such as limiting the total number of participants in the voice chat room, the second user's participation in the voice chat room may be rejected. However, generally, the second user's request for participation in the voice chat room may be accepted.

In operation S160, the server 10 manages audio information transmitted and received through the voice chat room in which the first user and the second user participate. Specifically, the server 10 may transmits the audio information received from the first user to other voice chat room participants including the second user. In doing this, the first user, as a speaker, may be able to share audio information input by himself/herself with other voice chat room participants, and the second user may be able to receive the audio information of the first user.

Hereinafter, with reference to FIGS. 3 to 6, a specific embodiment of a method for operating a voice chat room subordinate to a message chat room by the server 10 described above with reference to FIG. 2 will be described.

Figure 3:
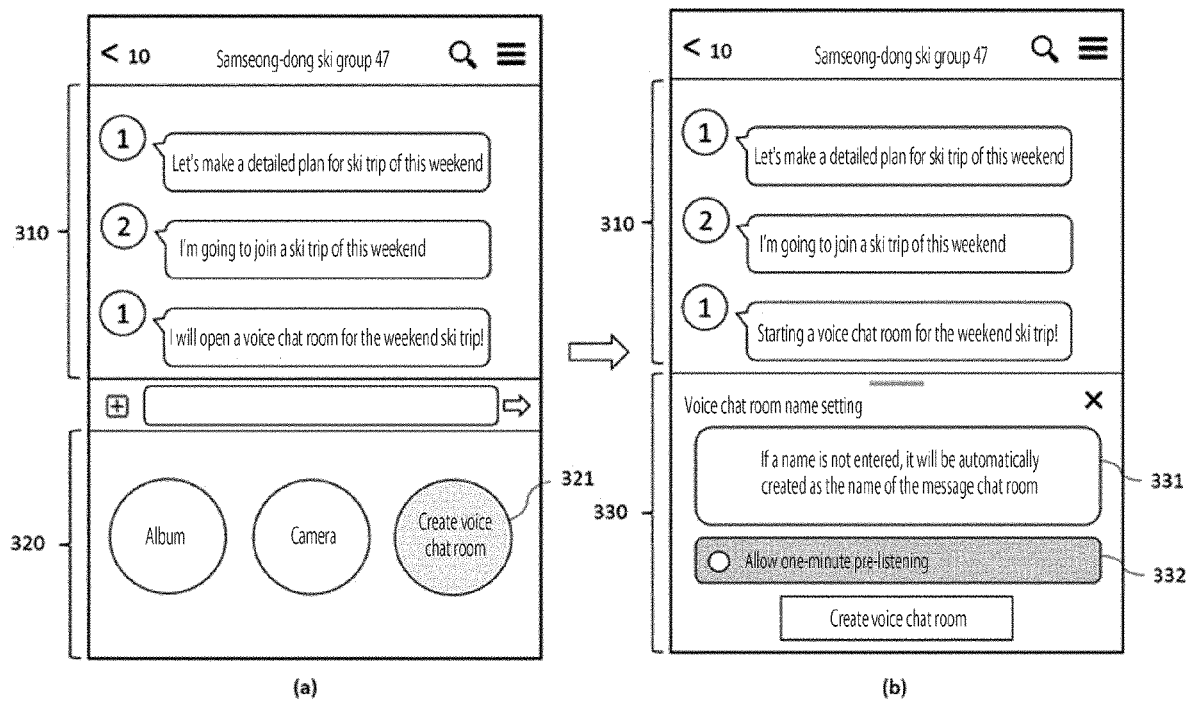
FIGS. 3 to 8 are diagrams illustrating exemplary screens displayed on a user terminal as a method for operating a voice chat room subordinate to a message chat room according to the present disclosure is performed.

FIG. 3 illustrates a screen on which a first terminal 20 requests creation of a voice chat room subordinate to a message chat room. Referring to FIG. 3, the first terminal 20 may display a screen of a message chat room 310. In the message chat room 310, messages transmitted and received between participants of the message chat room may be displayed. The messages may be displayed as a result of the server 10 performing operation S110.

The first terminal 20 may display an additional feature menu window 320 when an interaction for viewing additional features of the message chat room is received from the first user while the message chat room 310 is being displayed. The additional feature menu window 320 may be displayed in a part of an area where the message chat room is originally displayed. FIG. 3(a) shows an additional feature menu window displayed in an area where a keyboard is displayed in a message chat room as an example.

The first terminal 20 may display a voice chat room creation button 321 as one of the related features on the additional feature menu window 320. The first terminal 20 may receive an input of an interaction with respect to the button 321 from the first user.

Here, the voice chat room creation button 321 may be selectively displayed according to what authority the user has been granted in the message chat room. That is, in this embodiment, the first user may be a participant who corresponds to a host or moderator in the message chat room, and who has an authority to request the server 10 to create a voice chat room subordinate to the message chat room. Thus, the voice chat room creation button 321 is displayed in the first terminal 20.

On the other hand, the second user may be a participant who does not have an authority to request creation of a voice chat room. In this case, the voice chat room creation button 321 may not be displayed in the second terminal 30. This case will be described in more detail with reference to FIG. 7 below.

When the first terminal 20 receives an interaction with respect to the button 321 from the first user, a screen 330 requesting additional information for creating a voice chat room may be displayed. Specifically, as shown in (b) of FIG. 3, a screen to set a name of a voice chat room may be displayed. The first terminal 20 may receive a name of the voice chat room through an interface 331 of the screen. If a separate name of the voice chat room is not received, the server 10 may generate the name of the voice chat room as the same as the name of the message chat room.

Also, as shown in (b) of FIG. 3, a screen 332 to ask whether pre-listening is allowed may be displayed. Details related to a pre-listening function of a voice chat room will be described in more detail with reference to FIG. 8 below.

As shown in (b) of FIG. 3, when the first terminal 20 receives an interaction with respect to the voice chat room creation button from the first user, the first terminal 20 may transmit voice chat room creation request information to the server 10. In response to receiving the voice chat room creation request information, the server 10 performs operation S120.

Figure 4:
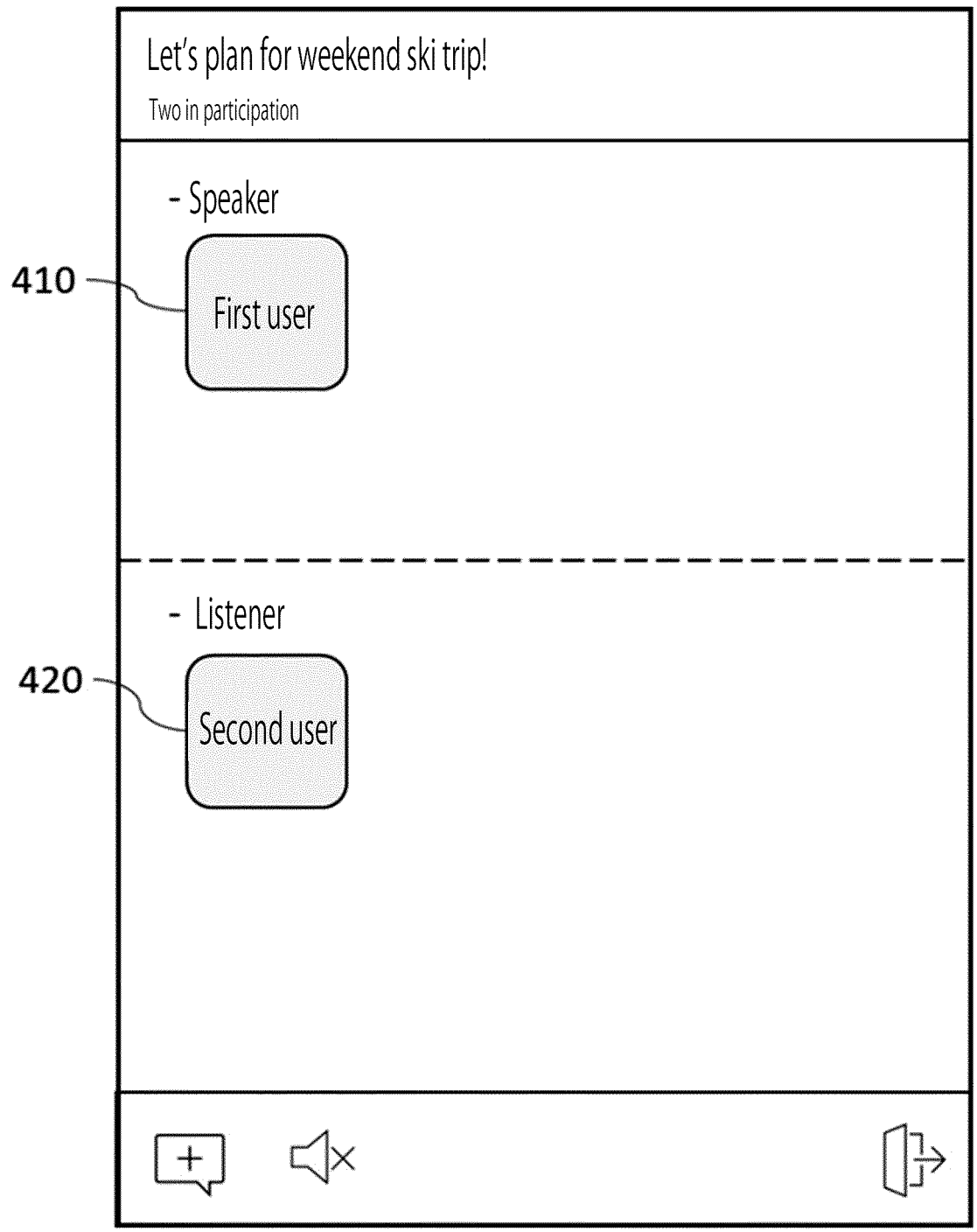

FIG. 4 shows a voice chat room screen displayed by the first terminal 20 and the second terminal 30. Here, a voice chat room may be created as a result of the server 10 performing operation S130.

When the first terminal 20 and the second terminal 30 enter the voice chat room, a screen of the voice chat room may be displayed as shown in FIG. 4. Speaker information 410 and listener information 420 may be separately included on the screen of the voice chat room. Referring to FIG. 4, it can be seen that a first user is designated as a speaker and a second user is designated as a listener.

Figure 5:
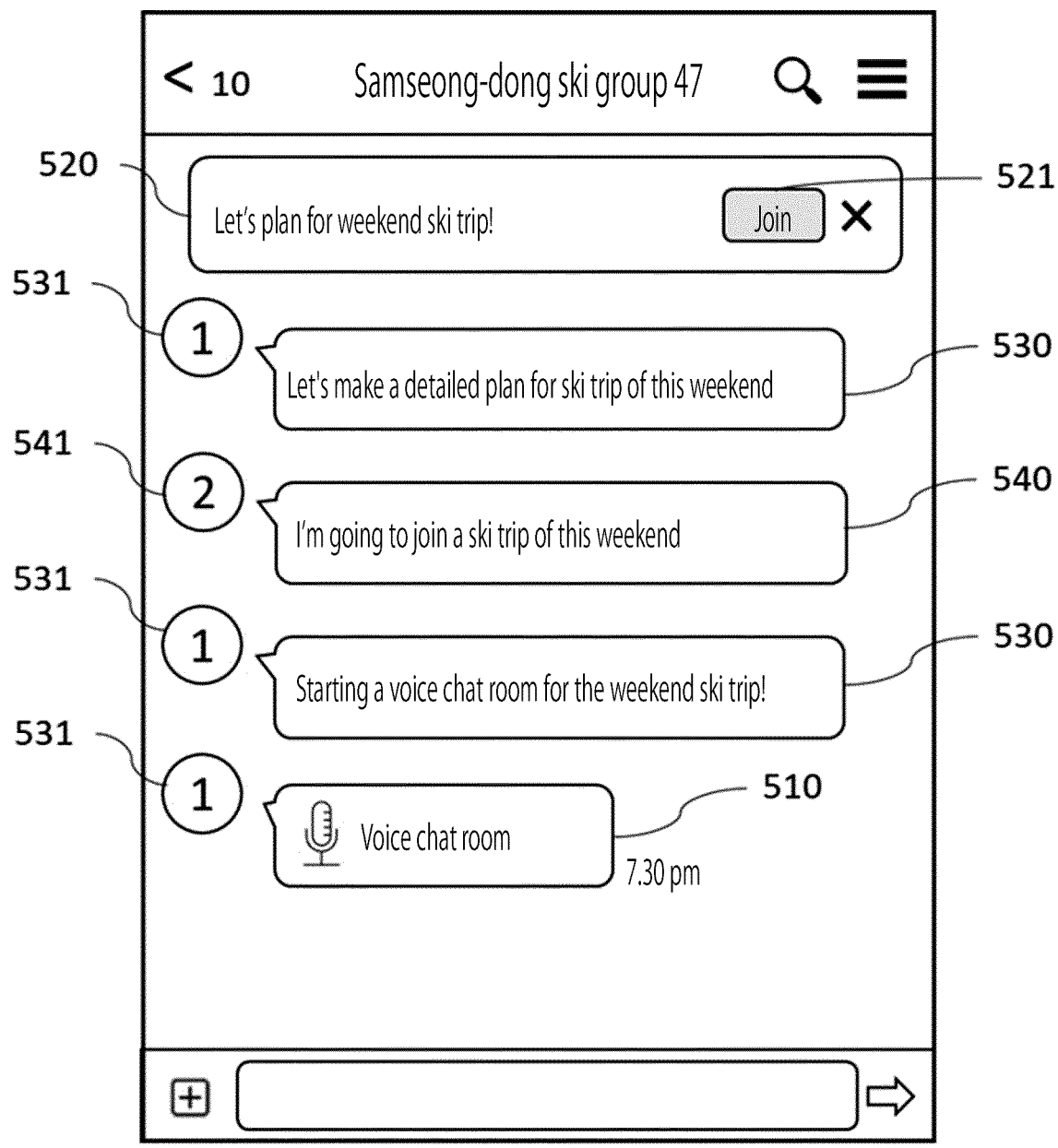

FIG. 5 illustrates a screen on which a first terminal 20 or a second terminal 30 displays, in a message chat room, information indicating that a voice chat room is being operated. The information indicating that a voice chat room is being operated is displayed as a result of the server performing operation S140.

A plurality of spoken messages transmitted by participants of the message chat room may be displayed in the message chat room. A spoken message may be displayed together with a participant's profile, ID, name, and the like, so that a speaker who has spoken the message can be displayed. In FIG. 5, the first user's spoken message 530 is displayed together with the first user's profile 531, and the second user's spoken message 540 is displayed together with the second user's profile 541.

The information indicating that a voice chat room is being operated may be displayed in various forms in the message chat room. First, information 510 indicating that the voice chat room is being operated may be displayed in the form of a message in the message chat room. The message 510 indicating that the voice chat room is being operated is displayed in the same form as other messages in the message chat room. Thus, if another message is displayed through the message chat room after the displaying of the message 510 indicating that the voice chat room is being operated, the displayed position of the message 510 may change. If a number of different messages are displayed through the chat room, the message 510 indicating that the voice chat room is being operated may be pushed out of a screen displaying the most recent messages.

The message 510 indicating that the voice chat room is being operated may be displayed in a form spoken by a user who created the voice chat room. Referring to FIG. 5, it can be seen that the message 510 indicating that the voice chat room is displayed together with the profile 531 of the first user, so that the message 510 can be displayed in the form of a message spoken by the first user.

Also, the information 520 indicating that the voice chat room is being operated may be displayed in the form of a fixed message in the message chat room. A message being displayed in the form of a fixed message in a message chat room means that the corresponding message is displayed in a partly designated area of the message chat room, and the displayed position thereof does not change even if another subsequent message is displayed. A fixed message form is often used to display an announcement in a message chat room, and the information indicating that the voice chat room is being operated is displayed in a similar form.

Together with the information indicating that the voice chat room is being operated, the first terminal 20 or the second terminal 30 may provide an interface for participating in the voice chat room. Referring to FIG. 5, it can be seen that a join button 521 for participating in the voice chat room is provided along with the information 520 indicating that the voice chat room is being operated. Also, the message 510 indicating that the voice chat room is being operated may be provided in the form as an interface through which an interaction such as touch or click can be applied.

Here, when an interaction of the first user or the second user is received with respect to the interface for participating in the voice chat room being operated, the first terminal 20 or the second terminal 30 may transmit a request for participation in the voice chat room to the server 10. In response to receiving the request for participation in the voice chat room, the server 10 performs operation S150.

Figure 6:
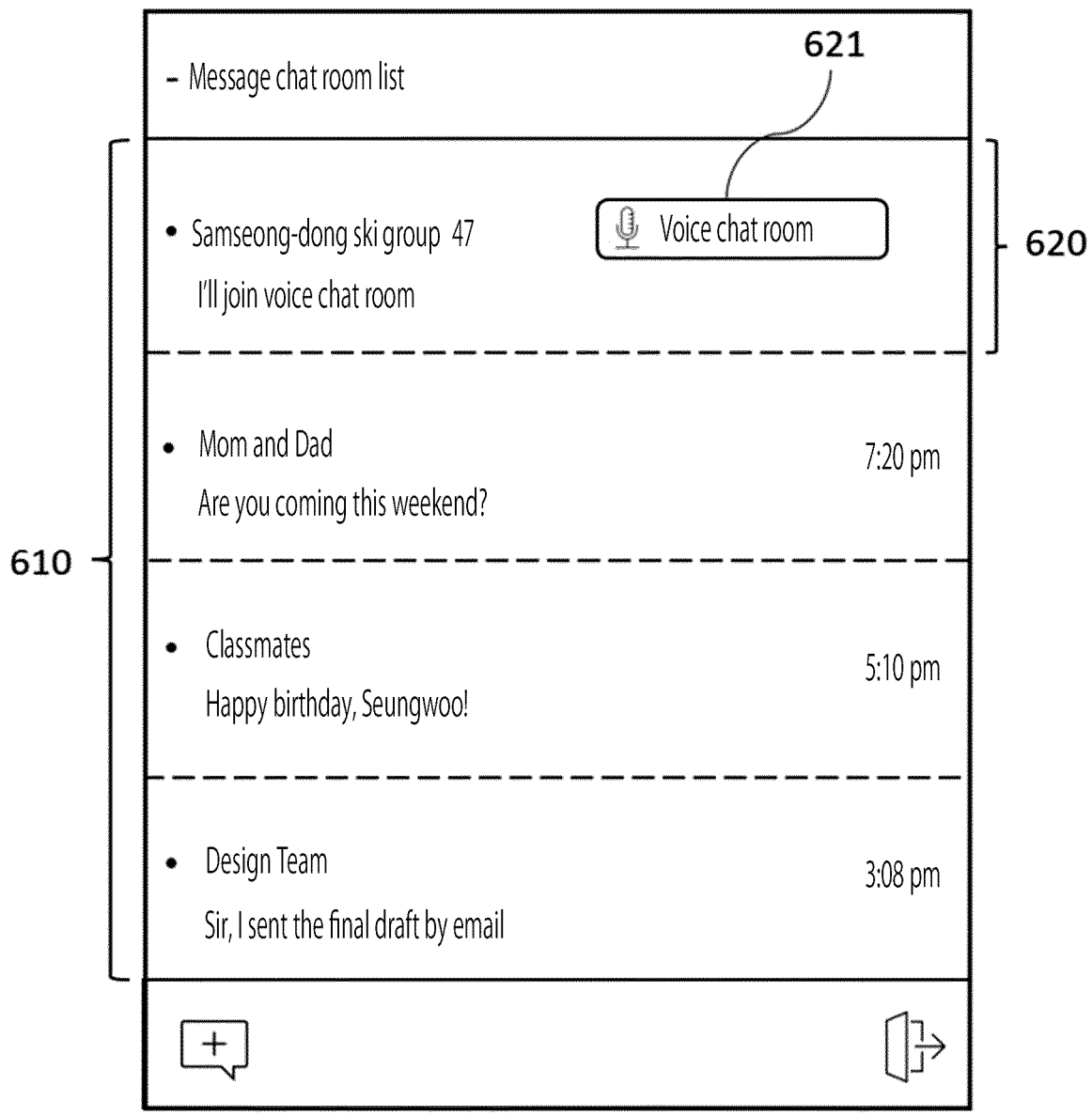

FIG. 6 illustrates a screen on which a first terminal 20 or a second terminal 30 displays information 621 indicating that the voice chat room is being operated on a message chat room list 610. The information indicating that the voice chat room is being operated may be displayed additionally as a result of the server 10 performing operation S140.

A first user or a second user may be participating in multiple message chat rooms. The first terminal 20 or the second terminal 30 may display the multiple message chat rooms in the form of a list 610. The first user or the second user may select one of the message chat rooms listed on the message chat room list 610 and enter the selected message chat room.

On the message chat room list 610, the information 621 indicating that the voice chat room is being operated may be displayed at a position 620 corresponding to a message chat room to which the voice chat room is subordinate. In doing so, it is possible to allow the first user or the second user to easily determine which message chat room, among the multiple message chat rooms in which the user has participated, is currently operating a voice chat room.

Together with the information indicating that the voice chat room is being operated, the first terminal 20 or the second terminal 30 may provide an interface for participating in the voice chat room. For example, by inputting an interaction to an area 621 in which the information indicating that the voice chat room is being operated is displayed, the first user or the second user may request for participation in the voice chat room. In response to the interaction, the first terminal 20 or the second terminal 30 may transmit to the server 10 a request for participation in the voice chat room of the first user or the second user. In response to receiving the request for participation in the voice chat room, the server 10 performs operation S150.

Hereinafter, with reference to FIGS. 7 to 9, additional features of a method for operating a voice chat room subordinate to a message chat room by the server 10 described above with reference to FIG. 2 will be described.

Figure 7:
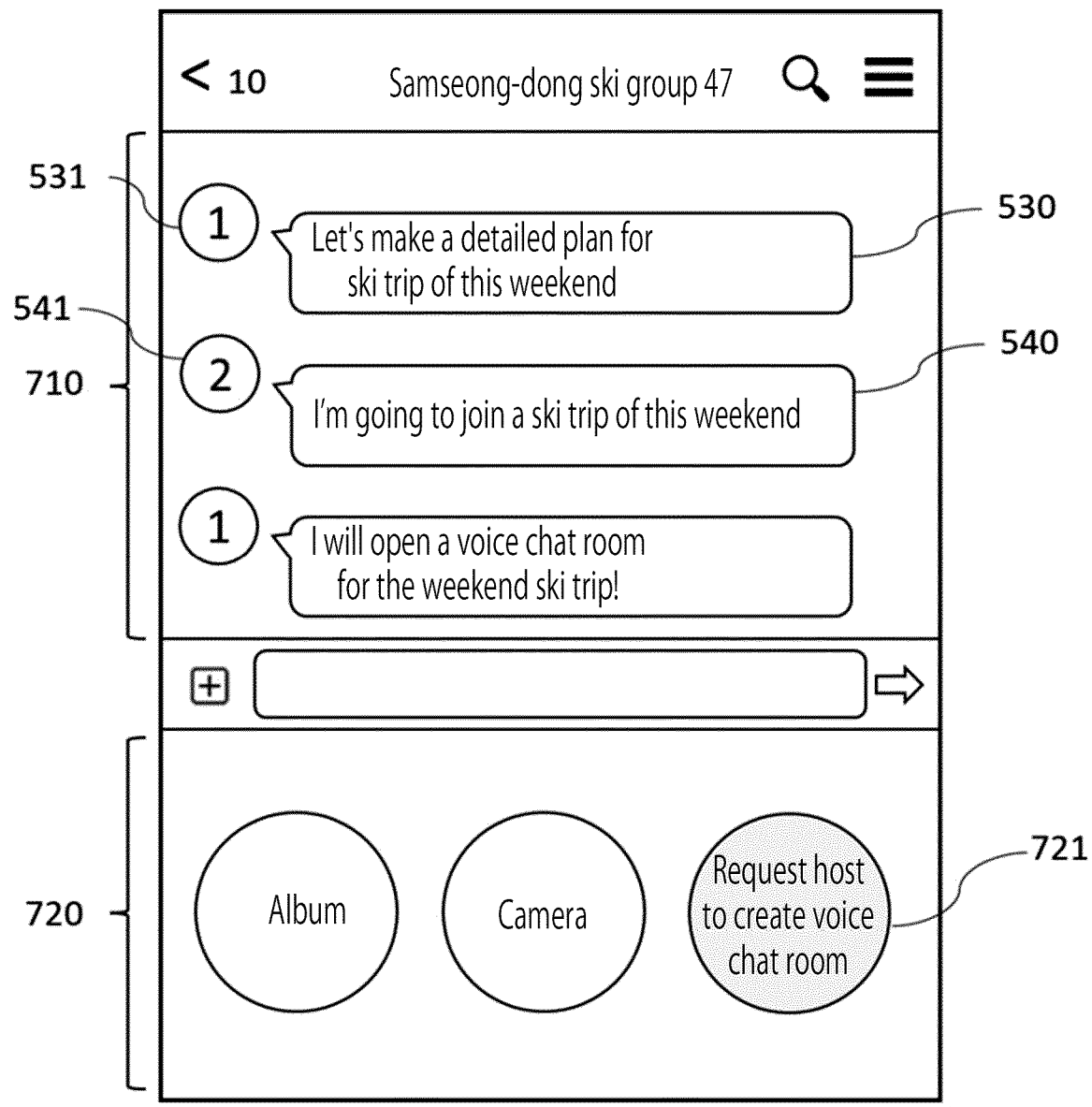

FIG. 7 illustrates a screen showing that a second terminal 30 requests another user to create a voice chat room subordinate to a message chat room. Referring to FIG. 7, the second terminal may display a screen 710 of a message chat room. In the message chat room, messages 530 and 540 transmitted and received between participants of the message chat room may be displayed. This may be a result corresponding to the above-described operation S110.

When an interaction associated with viewing related features of the message chat room is received from the second user while the message chat room 710 is being displayed, the second terminal 30 may display a related feature menu window 720. The related feature menu window 720 may be displayed in a part of area where the message chat room 710 is originally displayed. FIG. 7 shows an example in which a related feature menu window is displayed in an area where a keyboard is displayed in a message chat room.

In the second terminal 30, a button 721 for requesting the host to create a voice chat room may be displayed on the related feature menu window 720 as one of the related features. Here, the voice chat room creation button 721 may be selectively displayed according to what authority a user has been granted in the message chat room. That is, in the present embodiment, the second user may be a participant who is not the host or moderator of the message chat room and thus has no authority to directly request creation of a voice chat room subordinate to the message chat room from the server 10. In this case, using the function of the button 721, the second user may request creation of a voice chat room from another user (e.g., the first user) who has an authority to create a voice chat room subordinate to the message chat room.

The second terminal 30 may receive an input of an interaction with respect to the button 721 from the second user. The server 10 may receive information resulting from the interaction, and may transmit, to the first terminal 20, information indicating that the second user has requested creation of a voice chat room subordinate to the message chat room.

Using this function, even a participant who does not have an authority to request creation of a voice chat room subordinate to a message chat room can indirectly attempt to request creation of a voice chat room.

Figure 8:
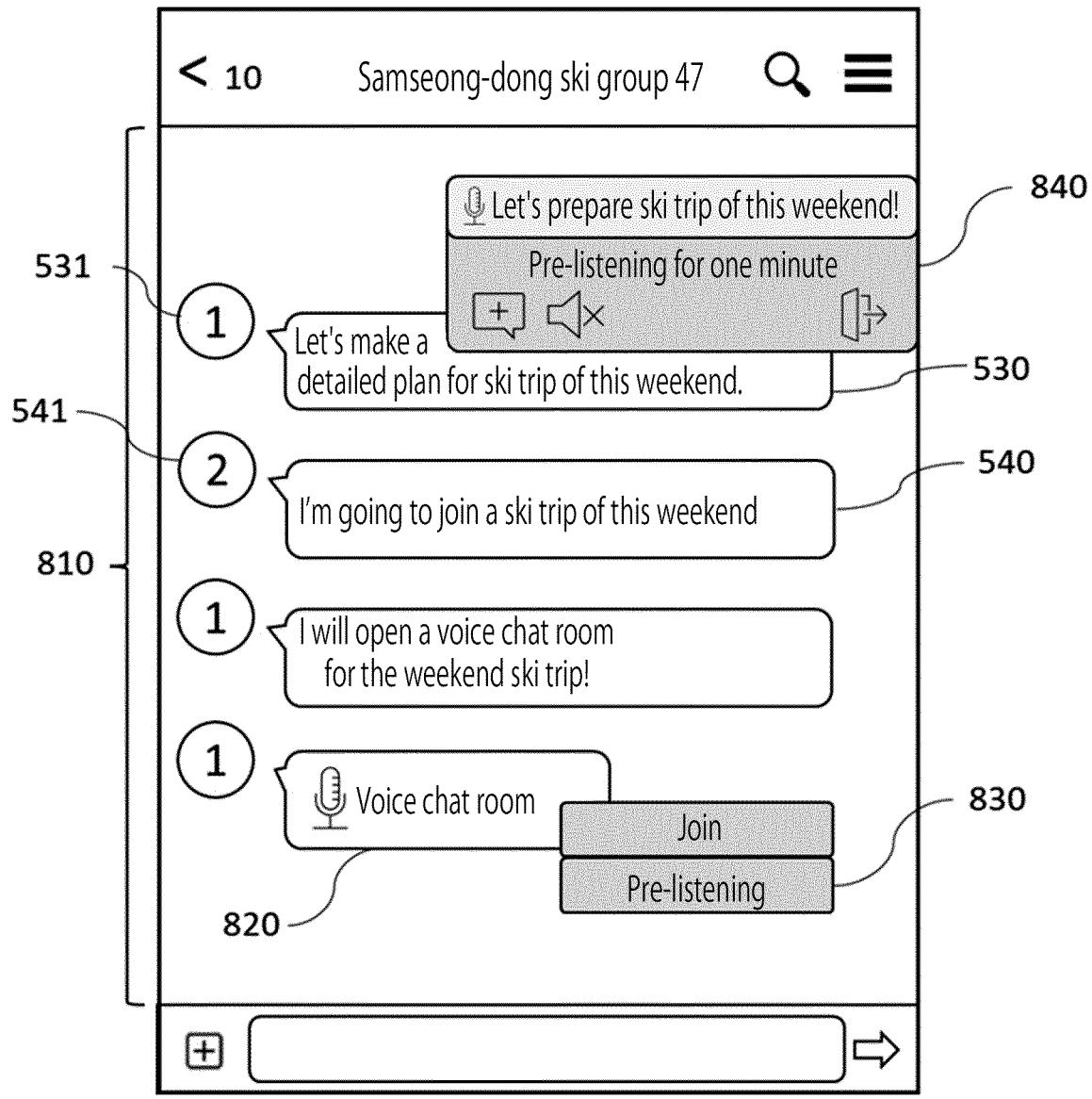

FIG. 8 illustrates a screen showing that the second terminal 30 performs a function of pre-listening to audio information provided through a voice chat room subordinate to a message chat room.

Referring to FIG. 8, when a voice chat room subordinate to a message chat room is being operated, a participant of the message chat room may be able to receive audio information provided through the voice chat room within a predetermined range without participating in the voice chat room.

Here, the audio information to be provided may be set within a predetermined time range. For example, a participant may be able to pre-listen to audio information for one minute even without participating in a voice chat room. Whether to activate the function (pre-listening function) to pre-listen to audio information in advance even without participating in a voice chat room may be determined by a creator or moderator of the voice chat room. In (b) of FIG. 3, the interface 332 for selecting whether or not to activate the pre-listening function is shown.

Referring to FIG. 8, the second terminal 30 may provide an interface 830 for starting a function of pre-listening to an currently operating voice chat room. The interface 830 may be displayed together with information 820 indicating that the voice chat room is now being operated. The second user may start the pre-listening function by inputting an interaction with respect to the interface 830. In this case, the second terminal 30 may display in a Picture-In-Picture (PIP) method a screen 840 notifying the pre-listening function in activation, so that the screen 840 is overlapped on the screen 810 displaying the message chat room.

Using the pre-listening function, a user may be able to simply and easily check some of the audio information to be provided through a voice chat room, without feeling burden of participating in the voice chat room.

Figure 9:
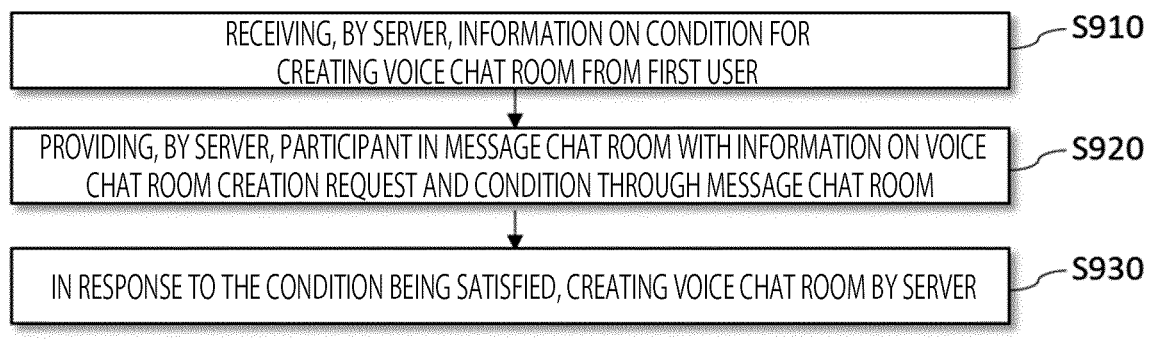
FIG. 9 is a flowchart for explaining a method for operating a voice chat room subordinate to a message chat room according to another embodiment of the present disclosure.

FIG. 9 is a flowchart for explaining a function of creating a voice chat room according to a pre-received condition of a server 10.

Figure 2:
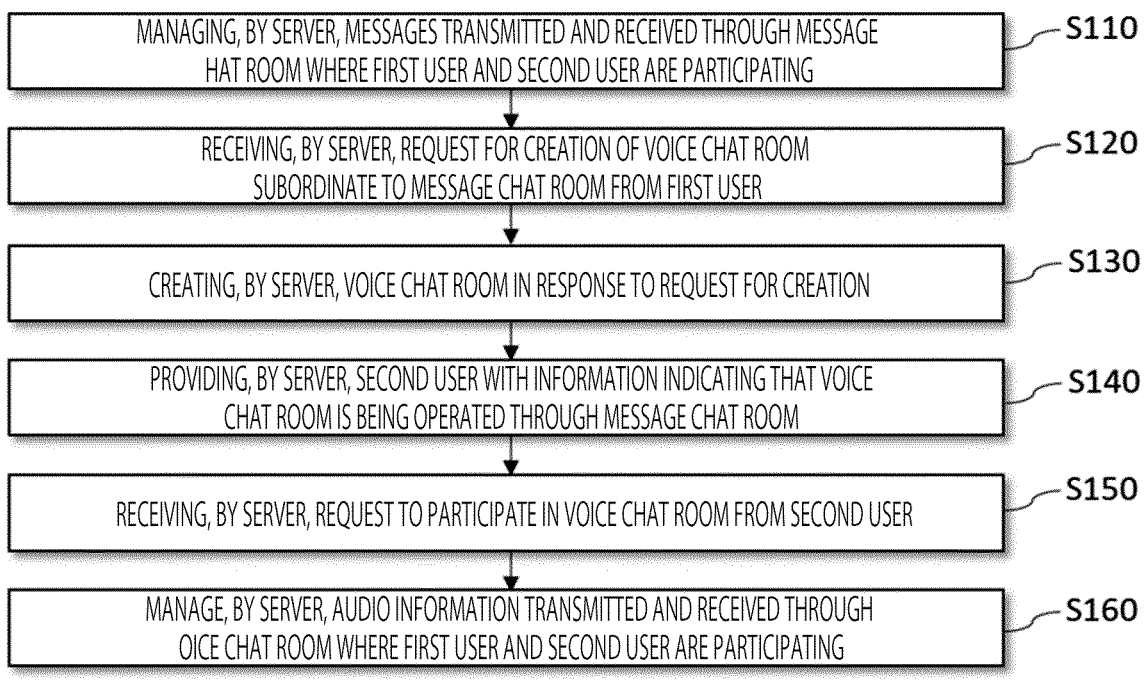
FIG. 2 is a flowchart illustrating a method for operating a voice chat room subordinate to a message chat room according to an embodiment of the present disclosure.

Operation S910 may be included in operation S120 shown in FIG. 2. In operation S910, the server 10 may receive information on a condition for creating a voice chat room from a first user. Here, the condition for creating a voice chat room refers to a prerequisite for creating a voice chat room subordinate to a message chat room.

For example, the condition for creating a voice chat room may be that a voice chat room is created at 8:00 PM tomorrow. Also, the condition for creating a voice chat room may be that the voice chat room is created when the number of participants of the message chat room reaches 100.

In operation S920, the server 10 may provide the information on voice chat room creation request and condition received operation S910 to participants of the message chat room through the message chat room. The information on the voice chat room creation request and condition may be displayed in the form of a message in the message chat room or may be displayed in the form of a fixed message.

Operation S930 may be included in operation S130 shown in FIG. 2. In operation S930, the server 10 may create a voice chat room when the condition received in operation S910 is satisfied. To this end, the server 10 should continuously monitor whether the condition received in operation S910 is satisfied. Also, when the condition received in operation S910 is satisfied, the server 10 may automatically create a voice chat room even without a separate request from the first user.\ In some cases, the server may provide the fact that the voice chat room has been created to participants of the message chat room through the message chat room to which the voice chat room is subordinate.

Although not shown in the drawings, through the voice chat room subordinate to the message chat room, the server 10 may provide at least some of the messages provided through the message chat room to participants of the voice chat room.

For example, it is assumed that a message including a specific image is provided through the message chat room. Then, when a participant of the voice chat room wishes to mention the specific image, the participant of the voice chat room may be able to call the message including the image provided in the message chat room, without need to upload the specific image to the voice chat room again. In response to a request for the call, the server 10 may provide the corresponding message to the participants of the voice chat room through the voice chat room.

Using this function, a participant of a voice chat room may be able to access a message provided through a message chat room to which the voice chat room is subordinate, and to easily provide the message to other participants of the voice chat room.

Figure 10:
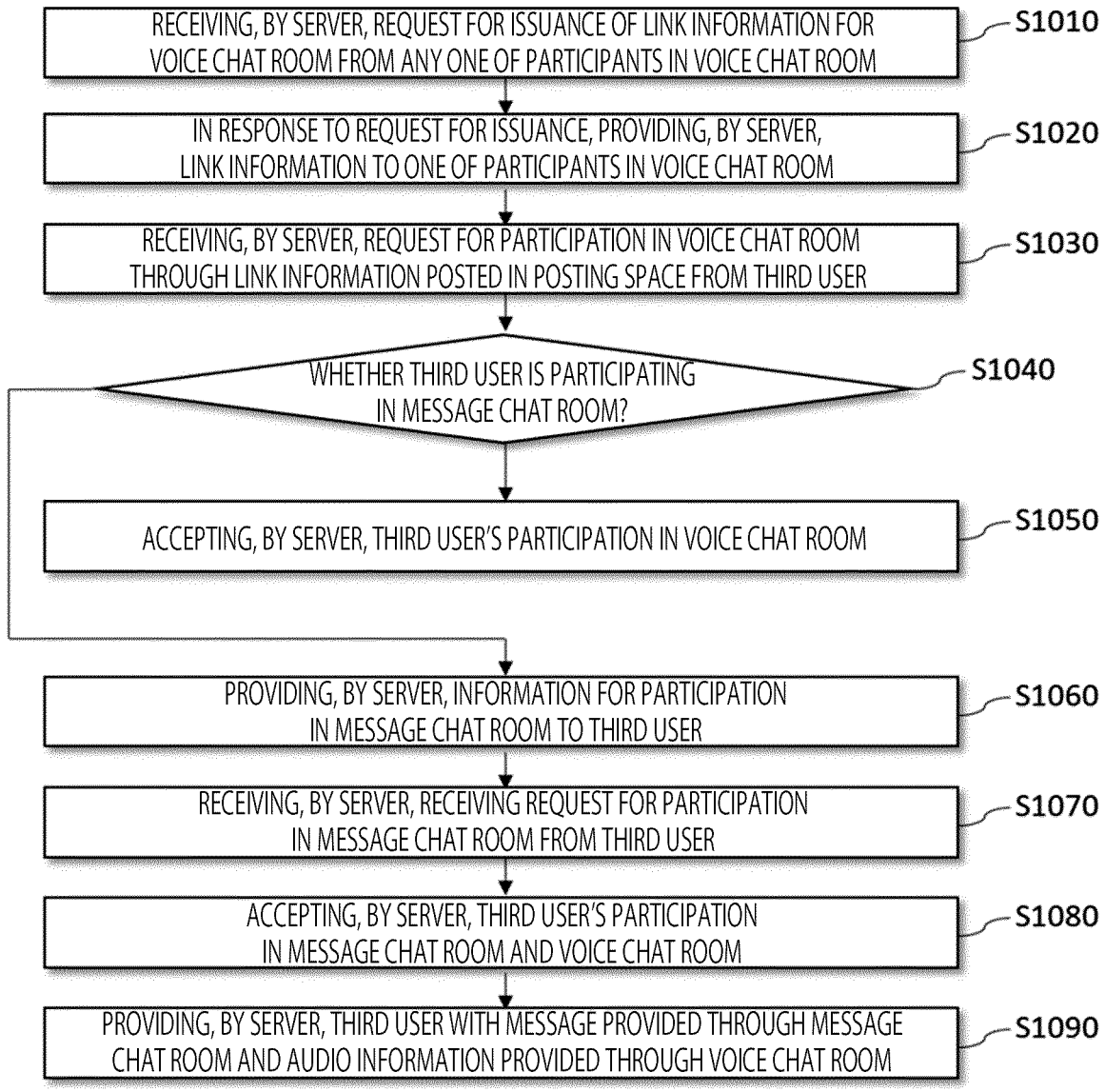
FIG. 10 is a flowchart illustrating a method for operating a voice chat room subordinate to a message chat room according to yet another embodiment of the present disclosure.

Hereinafter, with reference to FIG. 10, an additional embodiment of a method for operating a voice chat room subordinate to a message chat by a server 10 of the present disclosure will be described.

In operation S1010, the server 10 receives a request for issuance of voice chat room link information from any one of participants of a voice chat room. Through the link information, a user terminal may transmit a request for participation in the voice chat room to the server 10.

There may be separate link information for a message chat room to which the voice chat room is subordinate. In this case, voice chat room link information and message chat room link information may be separate and different from each other. Thus, if a user terminal accesses the server through the voice chat room link information, this access may corresponds to requesting participation in the voice chat room. Participation in the message chat room is a prerequisite to participate in the voice chat room, and this will be described again below. On the other hand, if a user terminal accesses the server through the message chat room link information, this access may correspond to requesting participation in the message chat room rather than the voice chat room. Thus, if such a participation request is accepted, a user may be provided through the message chat room with information indicating that the voice chat room is being operated, but the user may not participate in the voice chat room.

Here, the link information may refer to information on a link connected to the voice chat room. For example, the link information may be provided in the form of a Custom URL Scheme, an http URL, a QR code, a highlighted text, or an icon. The Custom URL Scheme may be in the form of link information for executing an application. The http URL may be in the form of link information linking to a predetermined web page. The QR code is a two-dimensional barcode representing information in a black and white plaid pattern, and may include, for example, information linking to a predetermined web page. The highlighted text may be in the form of a text or in the form in which all or part of a text is transformed, and may include link information linking to a predetermined web page. The icon refers to a pictogram represented as a symbolic picture so that an object, a facility, a shape, a concept, and the like can be easily recognized, and the icon may include information linking to a predetermined web page.

In operation S1020, the server 10 provides link information to any one of the participants of the voice chat room in response to the issuance request received in operation S1010. The link information may be provided in the form of text information to a participant's terminal or may be stored directly in a clipboard memory of the participant's terminal.

Thereafter, the voice chat room link information may be posted in an arbitrary posting space prior to operation S1030. For example, a voice chat room participant provided with the link information in operation S1020 may post the link information in an arbitrary posting space. In addition, in some cases, the server 10 may post the voice chat room link information in the arbitrary posting space in various ways. Here, the arbitrary posting space may be another message chat room, an Internet community post, and a web page introducing message chat rooms or voice chat rooms.

In operation S1030, the server 10 receives a request for participation in the voice chat room from a third user through the link information posted in the posting space.

In operation S1040, the server 10 determines whether the third user is participating in the message chat room.

When it is determined in operation S1040 that the third user is participating in the message chat room, operation S1050 is performed. In operation S1050, the server 10 accepts the third user's participation in the voice chat room. Accordingly, the server 10 may be able to manage audio information transmitted and received through the voice chat room in which the third user participates. In addition, the server 10 may provide a screen of a voice chat room, which is similar to that shown in FIG. 4, to the third terminal 40 (the third user's terminal). In this case, information indicating that the third user is designated as a speaker or a listener may be included on the screen of the voice chat room.

When it is determined in operation S1040 that the third user is not participating in the message chat room, operation S1060 is performed. In operation S1060, the server 10 provides information for participation in the message chat room to the third user. Here, the information for participation in the message chat room may include a topic of the message chat room, participation conditions, a creation time, information on participants who have already participated, and the like. Also, the information for participation in the message chat room may include an interface through which the third user is able to select or create a profile to be used in the message chat room. Specifically, the information for participation in the message chat room may include an interface through which the third user determines whether to participate in the message chat room with a previously used profile or a newly created profile.

In operation S1070, the server 10 receives a request for participation in the message chat room from the third user. Here, the request for participation in the message chat room may be information transmitted to the server 10 through the interface provided to the third user in operation S1060.

In operation S1080, the server 10 accepts the third user's request to participation both in the message chat room and the voice chat room, unless there is a special reason for rejection. Therefore, after operation S1080, the third user may become a participant of the voice chat room as well as a participant of the message chat room.

In operation S1090, the server 10 simultaneously provides the third user with a message provided through the message chat room and audio information provided through the voice chat room. That is, the server 10 may simultaneously provide the user with the message provided through the message chat room as visual information and the audio information provided through the voice chat room as auditory information. In some cases, in the third terminal 40, a window notifying that the audio information is being provided may be displayed to overlap a portion of the screen on which the message chat room is displayed.

Hereinafter, with reference to FIGS. 11 to 13, a specific embodiment of a method for operating a voice chat room subordinate to a message chat room by the server 10 described above with reference to FIG. 10 will be described.

Figure 11:
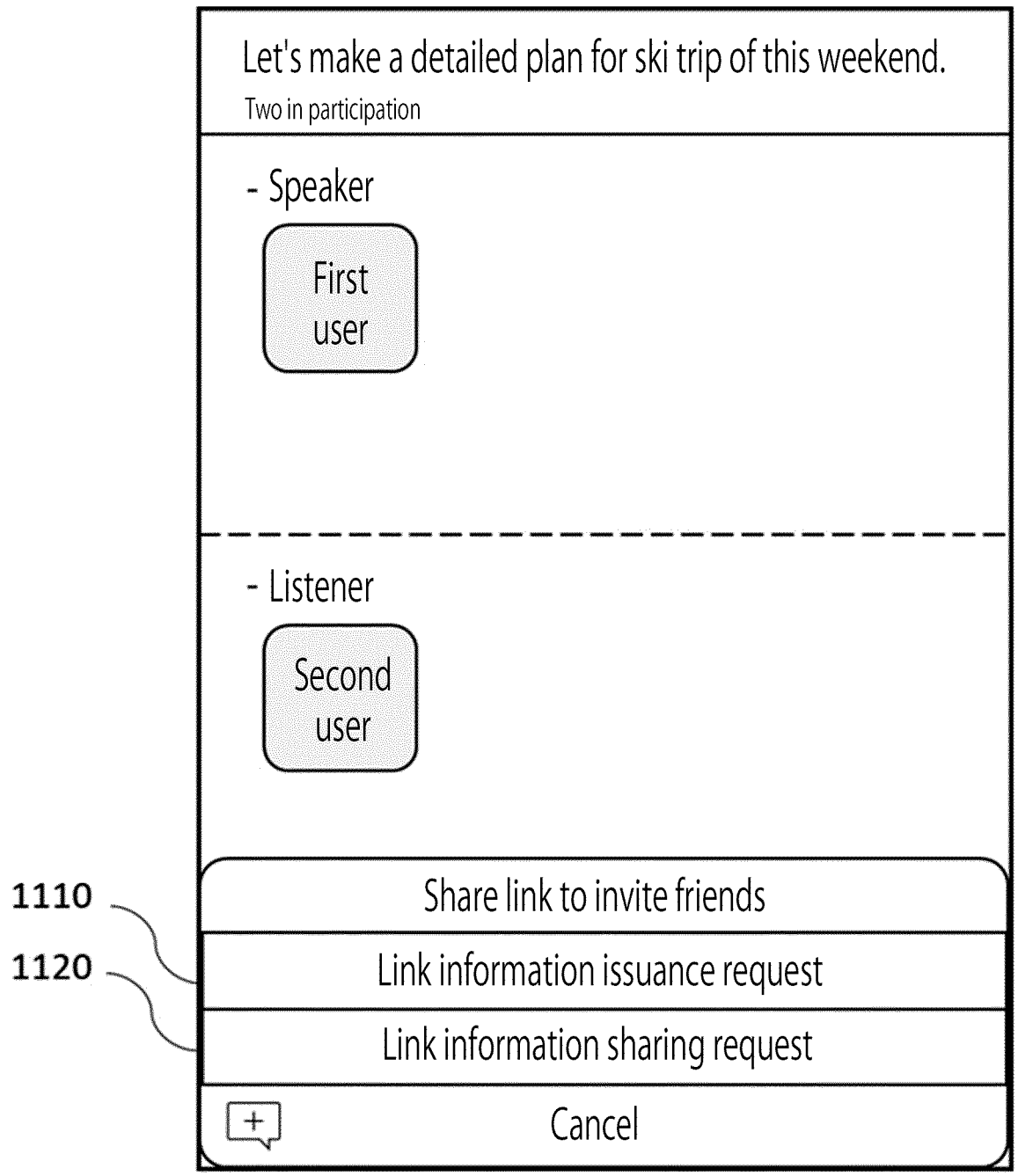
FIGS. 11 to 13 are diagrams illustrating exemplary screens displayed on a user terminal as a method for operating a voice chat room subordinate to a message chat room according to the present disclosure is performed.

FIG. 11 illustrates a screen on which a first terminal 20 or a second terminal 30 requests a server 10 to issue voice chat room link information.

Referring to FIG. 11, the first terminal 20 or the second terminal 30 may display an interface 1110 for requesting issuance of link information issuance request and an interface 1120 for requesting sharing of link information. When an interaction is received from the first user or the second user with respect to the interface 1110 for requesting issuance of link information, the first terminal 20 or the second terminal 30 may transmit information for requesting issuance of voice chat room link information. The server 10 receives a request for issuance of voice chat room link information and performs operation S1010. Then, the server 10 may provide the link information to the first terminal 20 or the second terminal 30 in the form of a text. This corresponds to the server 10 performing operation S1020.

Further, when the first user or the second user inputs an interaction with respect to the interface 1120 for requesting sharing of link information, the server 10 may share the link information in a posting space designated by the first user or the second user.

Figure 12:
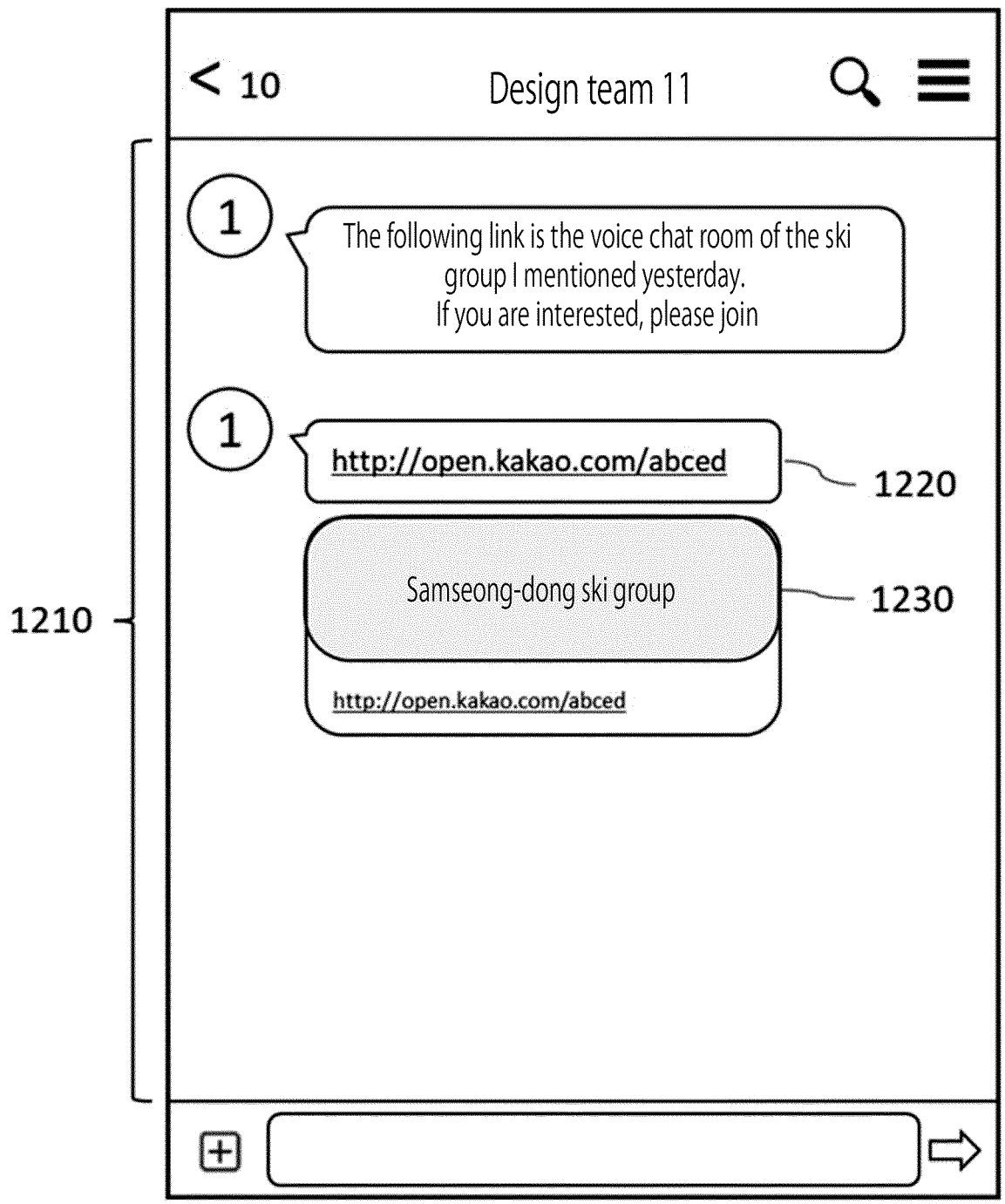

FIG. 12 illustrates a screen on which a first terminal 20 posts voice chat room link information in a posting space.

Referring to FIG. 12, it is illustrated that the first terminal 20 posts link information 1220 in a different message chat room 1210, which is a posting space, rather than a message chat room to which a voice chat room is subordinate. Thumbnail information 1230 for the link information 1220 may be displayed in the message chat room 1210. A participant of the different message chat room 1210 may request for participation in the voice chat room from the server 10 through the posted link information 1220.

Figure 13:
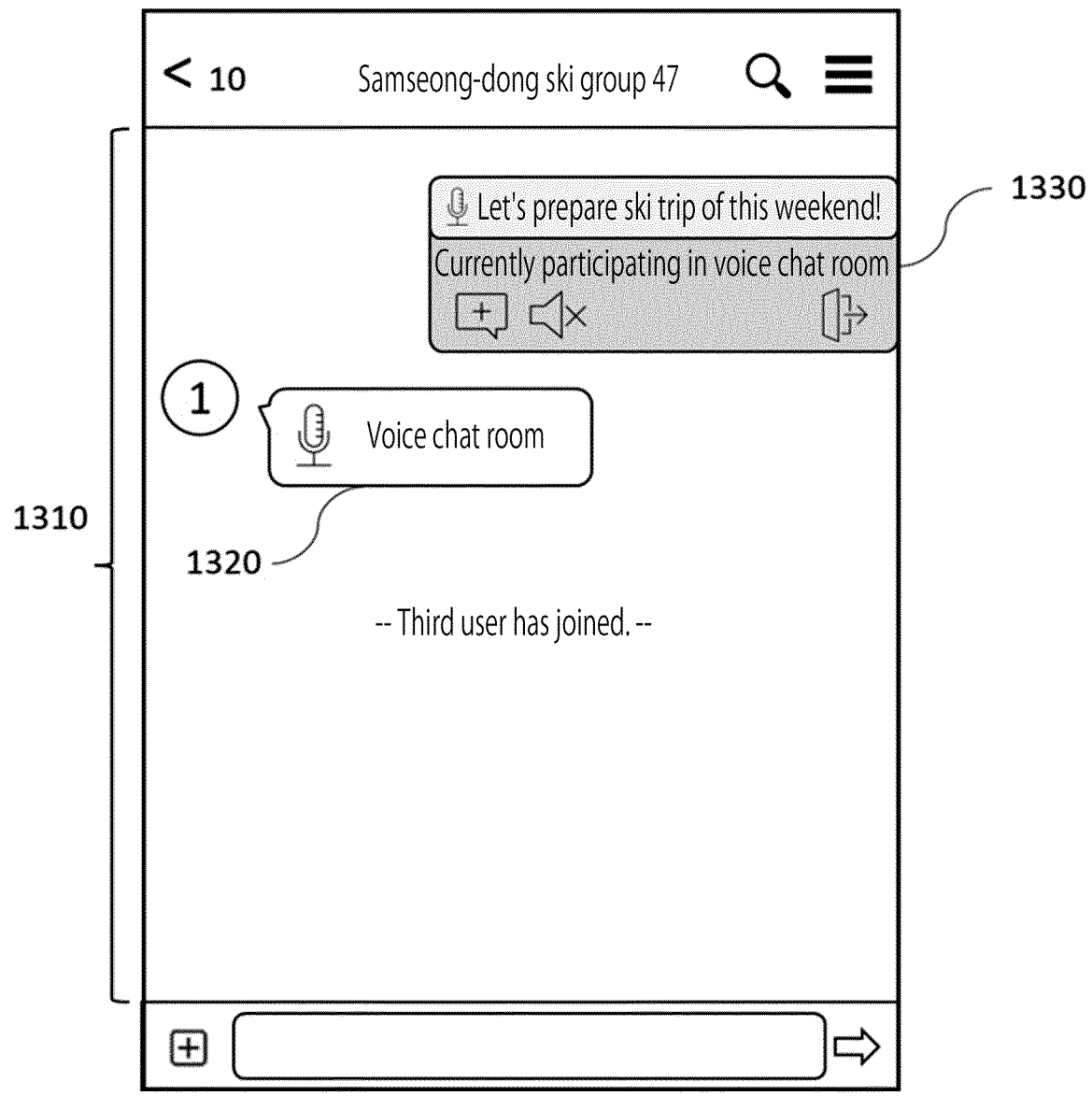

FIG. 13 illustrates a screen on which the third terminal 40 simultaneously receives a message provided through a message chat room and audio information provided through a voice chat room from the server 10.

Referring to FIG. 13, when a third user participates in a message chat room, to which a voice chat room is subordinate, through voice chat room link information, the third user may be simultaneously provided with a message provided through the message chat room and audio information provided through the voice chat room. In this case, a third terminal 40 may display a screen 1330, which is to notify that the audio information is being provided, so as to overlap the screen 1310 displaying the message chat room. Also, information indicating that the voice chat room is being operated may be displayed in the form of a message 1320 in the message chat room.

Although not shown in the drawings, there may be a case where the voice chat room is terminated when the third user requests participation through link information. In this case, the server 10 may provide the third user with information indicating that the voice chat room is terminated.

Specifically, at a time when the server 10 receives a participation request from the third user, the voice chat room may be already in a terminated state.

In this case, when it is determined that the third user is participating in the message chat room, the server 10 may control the third terminal 40 to land at a page of the message chat room and may provide, at this page, information indicating that the voice chat room is terminated.

On the other hand, when it is determined that the third user is not participating in the message chat room, the server 10 may control the third terminal 40 to land at a page where information for participation in the message chat room is included, and may provide at this page information indicating that the voice chat room is terminated.

As such, in a case where the voice chat room is already terminated at a time when the server 10 receives a participation request from the third user, the server 10 may receive a request from the third user so that a notification can be provided if another voice chat room subordinate to the message chat room is created. Then, when another voice chat room subordinate to the message chat room is created, the server 10 may provide a notification to the third user.

Figure 14:
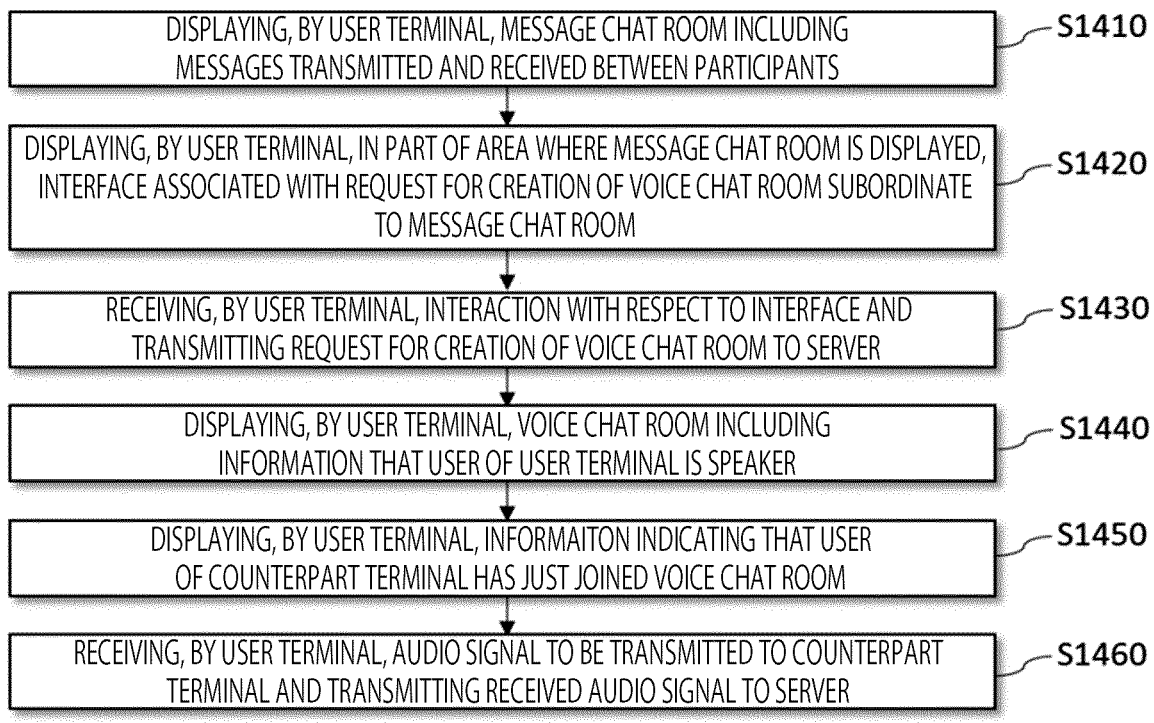
FIG. 14 is a flowchart illustrating a method for creating a voice chat room subordinate to a message chat room according to an embodiment of the present disclosure.

Hereinafter, with reference to FIG. 14, a method of creating a voice chat room subordinate to a message chat room by a user terminal will be described. For convenience of explanation, detailed descriptions of some redundant contents with those described with reference to FIGS. 2 to 13 will be omitted.

In operation S1410, a user terminal displays a message chat room including messages transmitted and received between participants. Here, a user of the user terminal may be the host or moderator of the message chat room, and may have an authority to request creation of a voice chat room subordinate to the message chat room.

In operation S1420, the user terminal displays an interface associated with a request for creation of a voice chat room subordinate to the message chat room in a part of an area where the message chat room is displayed.

In operation S1430, the user terminal receives an interaction with respect to the interface and transmits a request for creation of a voice chat room to the server 10.

A screen in which the above-described operations S1410, 1420, and 1430 are implemented is in FIG. 3.

In operation S1440, the user terminal displays a voice chat room including information indicating that the user is a speaker.

In operation S1450, the user terminal displays information indicating that a counterpart terminal's user has just joined the voice chat room. A counterpart may participate as a listener in the voice chat room. Here, both the user and the counterpart are participants of the message chat room to which the voice chat room is subordinate.

In operation S1460, the user terminal receives an audio signal to be transmitted to the counterpart terminal, and transmits the received audio signal to the server 10.

A screen in which the above-described operations S1440, S1450, and S1460 are implemented is shown in FIG. 4.

Figure 15:
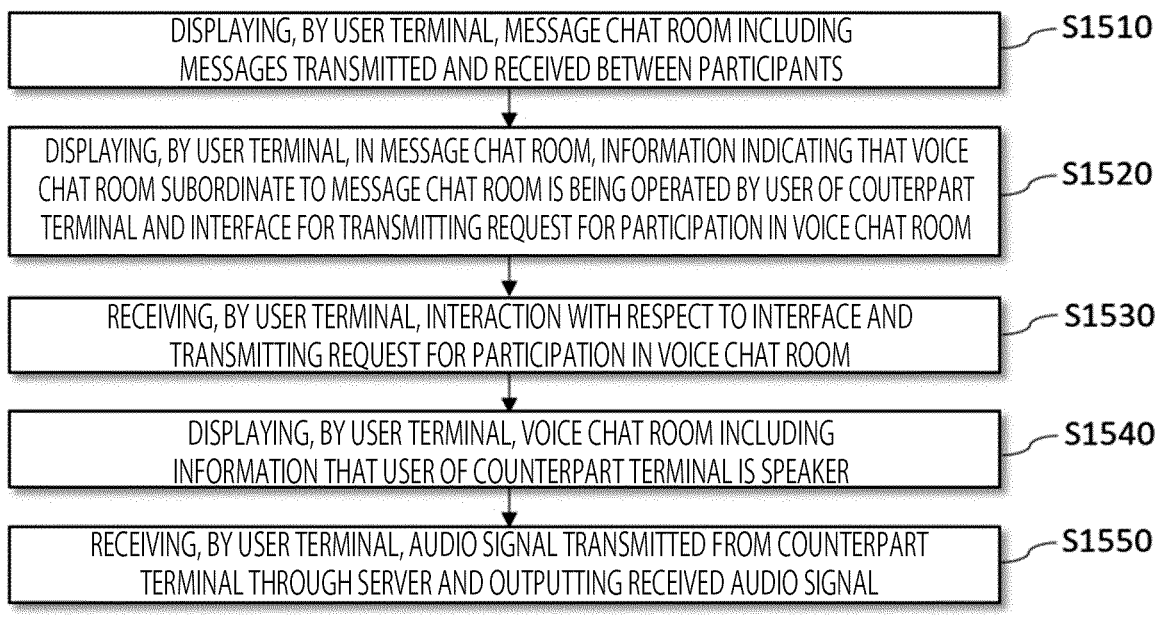
FIGS. 15 and 16 are flowcharts illustrating a method of participating in a voice chat room subordinate to a message chat room according to an embodiment of the present disclosure.

Hereinafter, a method for a user terminal to participate in a voice chat room subordinate to a message chat room will be described with reference to FIG. 15. For convenience of explanation, detailed descriptions of some redundant contents with those described with reference to FIGS. 2 to 13 will be omitted.

In operation S1510, a user terminal displays a message chat room including messages transmitted and received between participants.

In operation S1520, the user terminal displays information indicating that a voice chat room subordinate to a message chat room is being operated by a counterpart terminal's user in the message chat room, and an interface through which a request for participation in the voice chat room can be transmitted.

In operation S1530, the user terminal receives an interaction with respect to the interface, and transmits a request for participation in the voice chat room to the server 10.

A screen in which the above-described operations S1510, S1520 and S1530 are implemented is shown in FIGS. 5 and 6.

In operation S1540, the user terminal displays the voice chat room including information indicating that the user of the counterpart terminal is a speaker.

In operation S1550, the user terminal receives an audio signal transmitted from the counterpart terminal through the server 10, and outputs the transmitted audio signal.

A screen in which the above-described operations S1540 and S1550 are implemented is shown in FIG. 4.

Figure 16:
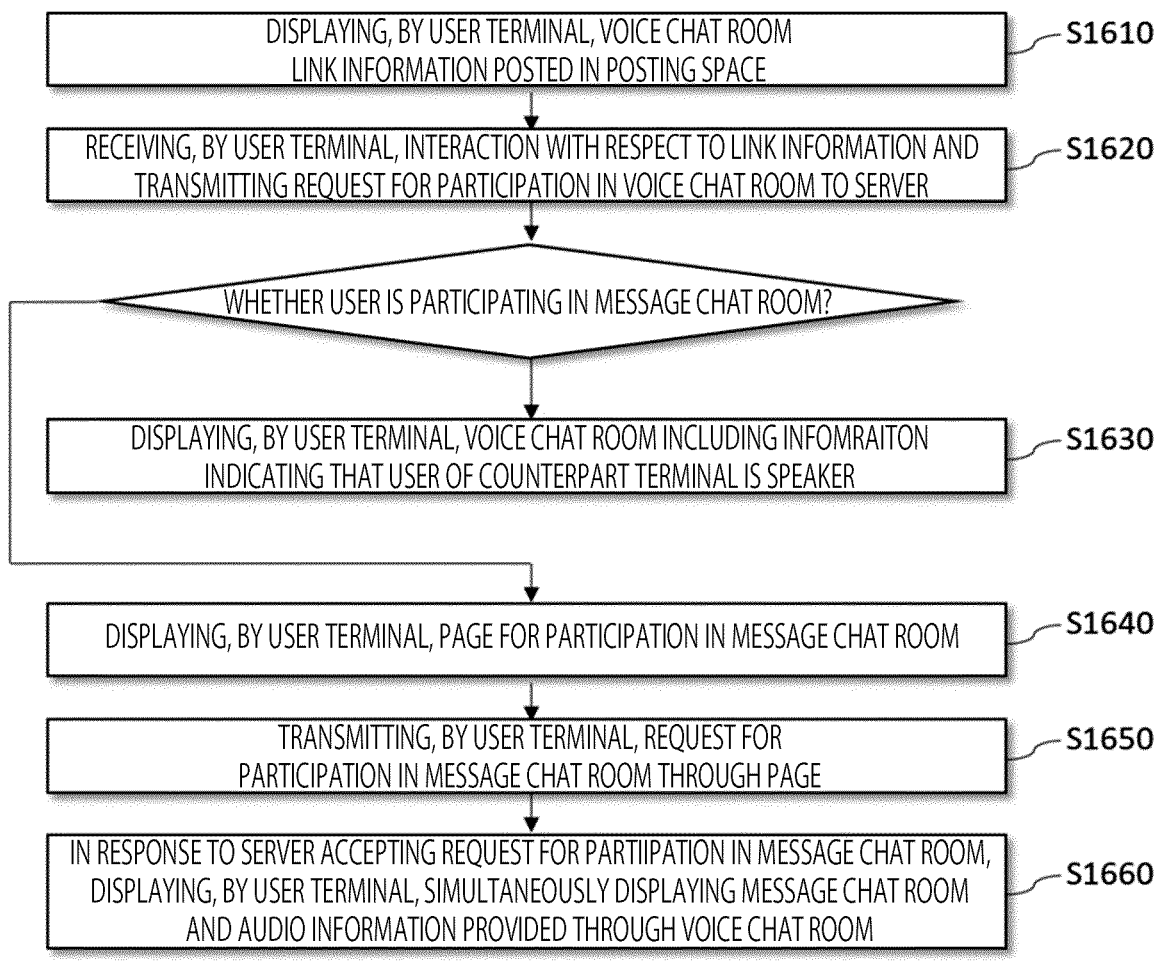

Hereinafter, another method for a user terminal to participate in a voice chat room subordinate to a message chat room will be described with reference to FIG. 16. For convenience of explanation, detailed descriptions of some redundant contents with those described with reference to FIGS. 2 to 13 will be omitted.

In operation S1610, a user terminal displays voice chat room link information posted in a posting space. This may be a situation in which the user terminal outputs a screen of an arbitrary message chat room or an internet bulletin board, and the voice chat room link information is included in the screen.

In operation S1620, the user terminal receives a user's interaction with respect to the link information and transmits a request for participation in the voice chat room to the server 10.

An operation to be subsequently performed by the user terminal may vary depending on whether the user is participating in a message chat room to which the voice chat room is subordinate.

If the user is participating in the message chat room to which the voice chat room is subordinate, the server 10 accepts the user's participation request and the user terminal performs operation S1630. In operation S1630, the user terminal displays the voice chat room including information indicating that the user of the counterpart terminal is a speaker.

A screen in which the above-described operation S1630 is implemented is shown in FIG. 4.

If the user is not participating in the message chat room to which the voice chat room is subordinate, the user terminal performs operations S1640, S1650 and S1660.

In operation S1640, the user terminal displays a page for participating in the message chat room.

In operation S1650, the user terminal transmits a request for participation in the message chat room to the server 10 through the page. Unless there is a special reason for rejection, the server 10 accepts the user's participation both in the message chat room and the voice chat room.

In operation S1660, when the server 10 accepts the request for participation in the message chat room, the user terminal simultaneously displays the message chat room and audio information provided through the voice chat room.

A screen in which the above-described operation S1660 is implemented is shown in FIG. 12.

According to the method for operating a voice chat room subordinate to a message chat room and the method for creating and participating in a voice chat room subordinate to a message chat room, there is an advantage in that a voice chat room can be operated in a state subordinate to a specific message chat room. The message chat room may have unique characteristics determined by a topic, a composition of participants, and the like. When the voice chat room is subordinate to the message chat room, there is an advantage that the voice chat room can also have its own characteristics in association with characteristics of the message chat room.

In addition, since the voice chat room is subordinate to the message chat room, there is an advantage in that participants who have already participated in the message chat room can be encouraged to participate in the voice chat room. In addition, since only the participants of the message chat room are allowed to participate in the voice chat room, it is possible to set qualifications or requirements of the participants of the voice chat room.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and accompanying drawings, and various modifications and changes can be made by those skilled in the art. Accordingly, one of ordinary skill would understand that the scope of the present disclosure is not to be limited by the explicitly described above embodiments but by the following claims and equivalents thereof

What is claimed is:

1. A method for operating a voice chat room subordinate to a pre-existing message chat room, the method comprising:
managing, by a server, messages transmitted and received through the pre-existing message chat room to allow a first user operating a first terminal and a second user operating a second terminal to participate in the pre-existing message chat room;
receiving, by the server, a request for creation of the voice chat room subordinate to the pre-existing message chat room from the first terminal, wherein the voice chat room is configured to allow participants operating participating terminals of the voice chat room to transmit and receive audio information with each other and configured to allow only participants operating participating terminals of the pre-existing message chat room to participate in the voice chat room;
creating, by the server, the voice chat room in response to the received request for creation of the voice chat room;
providing, by the server, information that the voice chat room is being operated to the second terminal through the pre-existing message chat room;
providing, by the server, information that the voice chat room is being operated to the second terminal through a message chat room list;
receiving, by the server, a request for participation in the voice chat room from the second terminal; and
managing, by the server, audio information transmitted and received through the voice chat room, wherein the first user operating the first terminal and the second user operating the second terminal are allowed to participate as participants in the voice chat room.

2. The method of claim 1, wherein in the providing of the information that the voice chat room is being operated through the pre-existing message chat room, the server provides an interface for participating in the voice chat room together with the information that the voice chat room is being operated.

3. The method of claim 1, wherein in the receiving of the request for participation in the voice chat room, the server receives the request for participation in the voice chat room through the pre-existing message chat room.

4. The method of claim 1, further comprising:
receiving, by the server, the request for participation in the voice chat room from a third terminal to allow a third user operating the third terminal to participate through voice chat room link information posted in a posting space.

5. The method of claim 4, further comprising:
receiving, by the server, a request for issuance of voice chat room link information from one of the participating terminals of the voice chat room; and
providing, by the server, the link information to one of the participating terminals of the voice chat room in response to the request for issuance.

6. The method of claim 4, further comprising:
in response to the request for participation in the voice chat room from the third terminal, allowing, by the server, participation of the third user operating the third terminal in the voice chat room when the third user operating the third terminal is allowed to participate in the pre-existing message chat room.

7. The method of claim 4, further comprising:
in response to the request for participation in the voice chat room from the third terminal, providing, by the server, information for participation in the pre-existing message chat room to the third terminal when the third terminal is not being used to participate in the pre-existing message chat room.

8. The method of claim 7, further comprising:
in response to receiving a request for participation in the pre-existing message chat room from the third terminal, allowing, by the server, participation of the third user both in the pre-existing message chat room and the voice chat room through operation of the third terminal.

9. The method of claim 4, further comprising:
in response to the request for participation in the voice chat room from the third terminal, providing, by the server, the third terminal with information indicating termination of the voice chat room when the voice chat room is terminated at a time of receiving the request for participation in the voice chat room from the third terminal.

10. The method of claim 9, further comprising:
receiving, by the server, a request for notification of creation of any other voice chat room subordinate to the pre-existing message chat room from the third terminal; and
in response to the request for notification, providing, by the server, a notification to the third terminal when the voice chat room subordinate to the pre-existing message chat room is created.

11. The method of claim 1, further comprising:
managing, by the server, the first terminal from among the participating terminals with an authority to request the creation of the voice chat room from among the participating terminals of the pre-existing message chat room differently from any other participating terminal of the pre-existing message chat room; and
providing, by the server, an interface allowing the first user of the first terminal to request the creation of the voice chat room subordinate to the pre-existing message chat room
by operating the interface provided by the server.

12. The method of claim 1, further comprising:
managing, by the server, the first terminal with an authority to request creation of the voice chat room from among the participating terminals in the pre-existing message chat room differently from any other participating terminal of the pre-existing message chat room and the second terminal corresponds to the any other participating terminal;
receiving, by the server, information for requesting the creation of the voice chat room subordinate to the pre-existing message chat room from the second terminal; and
providing, by the server, information for requesting the creation of the voice chat room to the first terminal.

13. The method of claim 1, further comprising:
allowing, by the server, at least some of messages provided through the pre-existing message chat room to the participants operating the participating terminals of the voice chat room through the voice chat room.

14. The method of claim 1, further comprising:
receiving, by the server, a request for provision of at least a part of audio information provided through the voice chat room from the second terminal, which is not participating in the voice chat room; and in response to the request for provision of at least a part of audio information, providing, by the server, the at least a part of the audio information provided through the voice chat room to the second terminal.

15. The method of claim 14, wherein the at least a part of the audio information is audio information provided to the participating terminals of the voice chat room for a predetermined time based on a point in time when the server receives the request for provision of the at least a part of the audio information.

16. A method for participating in a voice chat room subordinate to a pre-existing message chat room, the method comprising:

displaying, by a first user terminal of a plurality of participating user terminals, the pre-existing message chat room containing messages transmitted and received between the participating user terminals, wherein the participating user terminals are configured to be operated by participants;

displaying, by the first user terminal, information that the voice chat room subordinate to the pre-existing message chat room is configured to be operated by a second user terminal, and an interface for transmitting a request for participation in the voice chat room, wherein the voice chat room is configured to allow participating user terminals operated by participants to transmit and receive audio information with each other, and in which only participating user terminals configured to be operated by participants of the pre-existing message chat room are allowed to participate in the voice chat room;

displaying, by the first user terminal, information indicating that the voice chat room subordinate to the pre-existing message chat room is being operated, so that the information corresponds to the pre-existing message chat room in a message chat room list in which information on multiple message chat rooms is displayed;

receiving, by the first user terminal, an interaction with respect to the interface of the first user terminal, and transmitting, by the first user terminal, a request for participation in the voice chat room to a server;

displaying, by the first user terminal, a voice chat room including information indicating that the second user terminal is configured to transmit audio information to other participants in the voice chat room; and receiving, by the first user terminal, an audio signal transmitted from the second user terminal through the server, and outputting, by the first user terminal, the transmitted audio signal, wherein the first user terminal and the second user terminal are participating terminals allowing participants in the pre-existing message chat room to participate.

17. A method for participating in a voice chat room subordinate to a pre-existing message chat room, the method comprising:

displaying, by a first user terminal, voice chat room link information posted in a posting space, wherein the voice chat room is a chat room in which participating user terminals are configured to transmit and receive audio information with each other, and in which only participating user terminals configured to be operated by participants of the pre-existing message chat room are allowed to participate in the voice chat room;

receiving, by the first user terminal, an interaction with respect to the link information and transmitting a request for participation in the voice chat room to a server;

in response to the first user terminal being allowed to participate in the pre-existing message chat room to which the voice chat room is subordinate, displaying, by the first user terminal, a voice chat room including information that a second user terminal is configured to transmit audio information to other participants in the voice chat room; and in response to the first user terminal not being one of the participating terminals of the pre-existing message chat room, displaying, by the first user terminal, a page for participation in the pre-existing message chat room.

18. The method of claim 17, further comprising:

transmitting, by the first user terminal, a request for participation in the pre-existing message chat room to the server through the page for participation in the pre-existing chat room; and in response to the server allowing the request for participation in the pre-existing chat room, simultaneously displaying, by the first user terminal, the pre-existing message chat room and audio information provided through the voice chat room.

19. The method of claim 18, wherein in the simultaneously displaying, the first user terminal displays a first screen showing the audio information so as to overlap a second screen showing the pre-existing message chat room.

20. The method of claim 17, further comprising:

in response to the voice chat room being terminated, displaying, by the first user terminal, information that the voice chat room is terminated.

* * * * *